(12) United States Patent
Kawanishi

(10) Patent No.: US 8,458,139 B2
(45) Date of Patent: Jun. 4, 2013

(54) IMAGE PROCESSING APPARATUS, CONTROL METHOD THEREOF, PROGRAM, AND STORAGE MEDIUM

(75) Inventor: Masaki Kawanishi, Yokohama (JP)

(73) Assignee: Canon Kabushiki Kaisha (JP)

( * ) Notice: Subject to any disclaimer, the term of this patent is extended or adjusted under 35 U.S.C. 154(b) by 605 days.

(21) Appl. No.: 12/469,201

(22) Filed: May 20, 2009

(65) Prior Publication Data

US 2009/0292678 A1 Nov. 26, 2009

(30) Foreign Application Priority Data

May 21, 2008 (JP) .................................. 2008-133544

(51) Int. Cl.
*G06F 17/30* (2006.01)

(52) U.S. Cl.
USPC ........................................................ 707/687

(58) Field of Classification Search
USPC ........................................................ 345/629
See application file for complete search history.

(56) References Cited

U.S. PATENT DOCUMENTS

| | | | | | |
|---|---|---|---|---|---|
| 4,959,801 | A | * | 9/1990 | Apley et al. | 345/469 |
| 6,456,285 | B2 | * | 9/2002 | Hayhurst | 345/422 |
| 6,466,209 | B1 | * | 10/2002 | Bantum | 345/589 |
| 6,633,685 | B1 | | 10/2003 | Kusama et al. | |
| 6,728,730 | B1 | * | 4/2004 | Muro et al. | 1/1 |
| 6,847,334 | B2 | * | 1/2005 | Hayhurst et al. | 345/1.2 |
| 2005/0104976 | A1 | * | 5/2005 | Currans | 348/231.5 |
| 2005/0210444 | A1 | * | 9/2005 | Gibson et al. | 717/108 |
| 2007/0103488 | A1 | * | 5/2007 | Ross et al. | 345/611 |
| 2007/0143308 | A1 | * | 6/2007 | Takayama et al. | 707/10 |
| 2007/0213107 | A1 | * | 9/2007 | Itou et al. | 463/1 |
| 2008/0254882 | A1 | * | 10/2008 | Watanabe | 463/31 |
| 2008/0294661 | A1 | * | 11/2008 | Garza et al. | 707/100 |

FOREIGN PATENT DOCUMENTS

| | | |
|---|---|---|
| JP | 2000-57314 A | 2/2000 |
| JP | 2004295577 A | 10/2004 |
| JP | 2006172203 A | 6/2006 |
| WO | 03/012652 A1 | 2/2003 |

OTHER PUBLICATIONS

E.A. Vander Veer ("PowerPoint 2007: The Missing Manual," O'Reilly Media, Inc., Dec. 22, 2006, Chapter 9.3.*

* cited by examiner

*Primary Examiner* — Debbie Le
*Assistant Examiner* — Richard Brown
(74) *Attorney, Agent, or Firm* — Rossi, Kimms & McDowell LLP

(57) ABSTRACT

An image processing apparatus is provided that reduces a data size of a composite file without affecting output when generating a composite file by merging multiple files containing objects. To accomplish this, in merging multiple files, the image processing apparatus determines whether or not objects (images or the like) contained in the multiple files are hidden behind another object. Further still, the image processing apparatus merges objects that are hidden behind another object as link information in the composite file, and image data corresponding to the objects is stored in a separate file.

14 Claims, 29 Drawing Sheets

F I G. 14
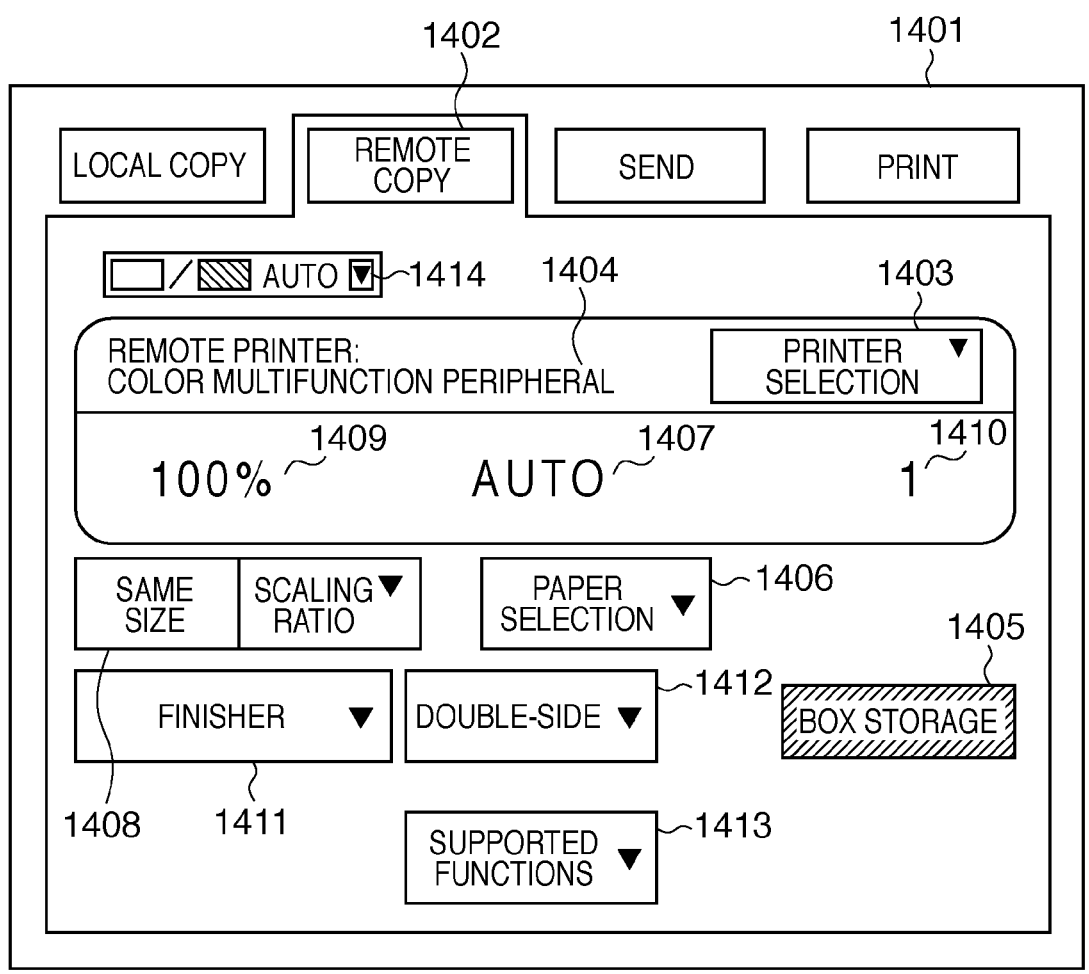

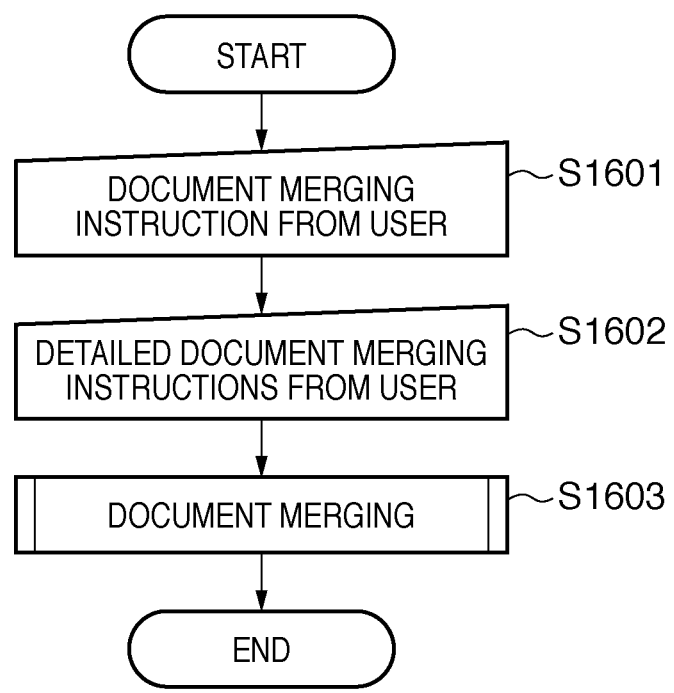
F I G. 16

F I G. 27
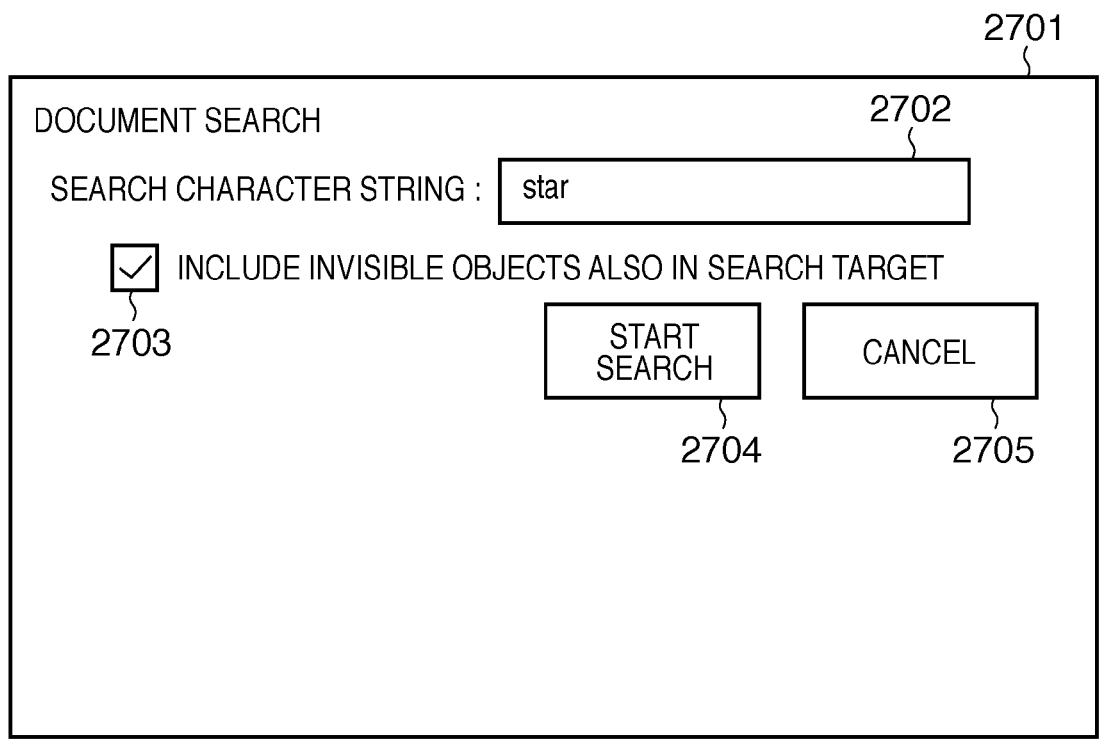

IMAGE PROCESSING APPARATUS, CONTROL METHOD THEREOF, PROGRAM, AND STORAGE MEDIUM

BACKGROUND OF THE INVENTION

1. Field of the Invention

The present invention relates to image processing apparatuses, control methods thereof, programs, and storage media in which multiple files are merged into a single file.

2. Description of the Related Art

Techniques are known in which an image data format not dependent on resolution (hereinafter referred to as vector data) is used when transferring image data from an image processing apparatus to another image processing apparatus connected on a network. By using vector data as the image data format in this manner, it is possible to prevent image deterioration caused by resolution conversions at the time of printing. Furthermore, techniques are also known in which additional information added to the image data (hereinafter referred to as metadata) is utilized in image searches and used as information to facilitate print processing.

Further still, if image data is stored as a file in a secondary storage device inside the image processing apparatus, it is possible for an operator to retrieve and repeat the output of the image data whenever desired. Hereinafter, a function in which image data is stored in a file format in a secondary storage device of the image processing apparatus for a purpose of reuse is referred to as a box function, and the file system is referred to as a box. It is possible to use the vector data and metadata in the files stored in the box. Furthermore, it is possible to merge the files inside the box.

For example, Japanese Patent Laid-Open No. 2000-57314 proposes a technique in which single portions of multiple sets of image data are extracted respectively and merged into a single set of image data. Furthermore, Japanese Patent Laid-Open No. 2000-57314 proposes a technique of embedding link information for referencing image data that is stored in a separate file without storing the image data in a composite file. In this way, the size of the composite file can be reduced.

However, the above-mentioned conventional techniques have problems such as the following. For example, in the technique described in Japanese Patent Laid-Open No. 2000-57314, regions of portions of multiple files are extracted to generate a new composite file, but sometimes the composite file does not contain sufficient information to meet the requirements of an operator. Further still, there is also a problem that in a case where all the portion regions as image data of the composite file are set to link information in other files, processing becomes complicated when outputting the composite file. That is, when outputting the composite file, a process must be carried out of obtaining the image data of all the regions from the link locations, which unfortunately puts a load on the system and takes time in processing.

SUMMARY OF THE INVENTION

The present invention enables realization of an image processing apparatus that reduces a data size of a composite file without affecting output when generating a composite file by merging multiple files containing objects.

One aspect of the present invention provides an image processing apparatus, comprising: a generation unit that generates a composite file in which multiple files are merged, a determination unit that determines, when the composite file is generated by the generation unit, whether or not at least one object of objects contained in the multiple files is to be visualized when the composite file is output, a first storage unit that stores, as a separate file, image data of an object determined not to be visualized based on a determination result of the determination unit, and a second storage unit that stores information indicating the image data stored in the separate file as link information in the composite file.

Another aspect of the present invention provides a control method for an image processing apparatus, comprising: generating a composite file in which multiple files are merged, determining, in the generating of the composite file, whether or not at least one object of objects contained in the multiple files is to be visualized when the composite file is to be output, initially storing as a separate file image data of an object determined not to be visualized based on a determination result of the determining, and secondarily storing information indicating the image data stored in the separate file as link information in the composite file.

Still another aspect of the present invention provides a computer program for executing on a computer the control method for an image processing apparatus according to the control method.

Further features of the present invention will be apparent from the following description of exemplary embodiments with reference to the attached drawings.

BRIEF DESCRIPTION OF THE DRAWINGS

FIG. 14 is a diagram showing one example of a display screen 1401 that is displayed to an operation unit 210 of the MFP 100.

FIG. 16 is a flowchart showing an operation of a document merging process according to the first embodiment.

FIG. 27 is a diagram showing a document search screen 2701 according to the third embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Hereinafter, description is given regarding a first embodiment with reference to FIG. 1 through FIG. 21. Hereinafter, description is given using a 1D color system MFP (multifunction peripheral) as an example of an image processing apparatus according to the present invention.

<Configuration of Image Processing Apparatus>

Figure 1:
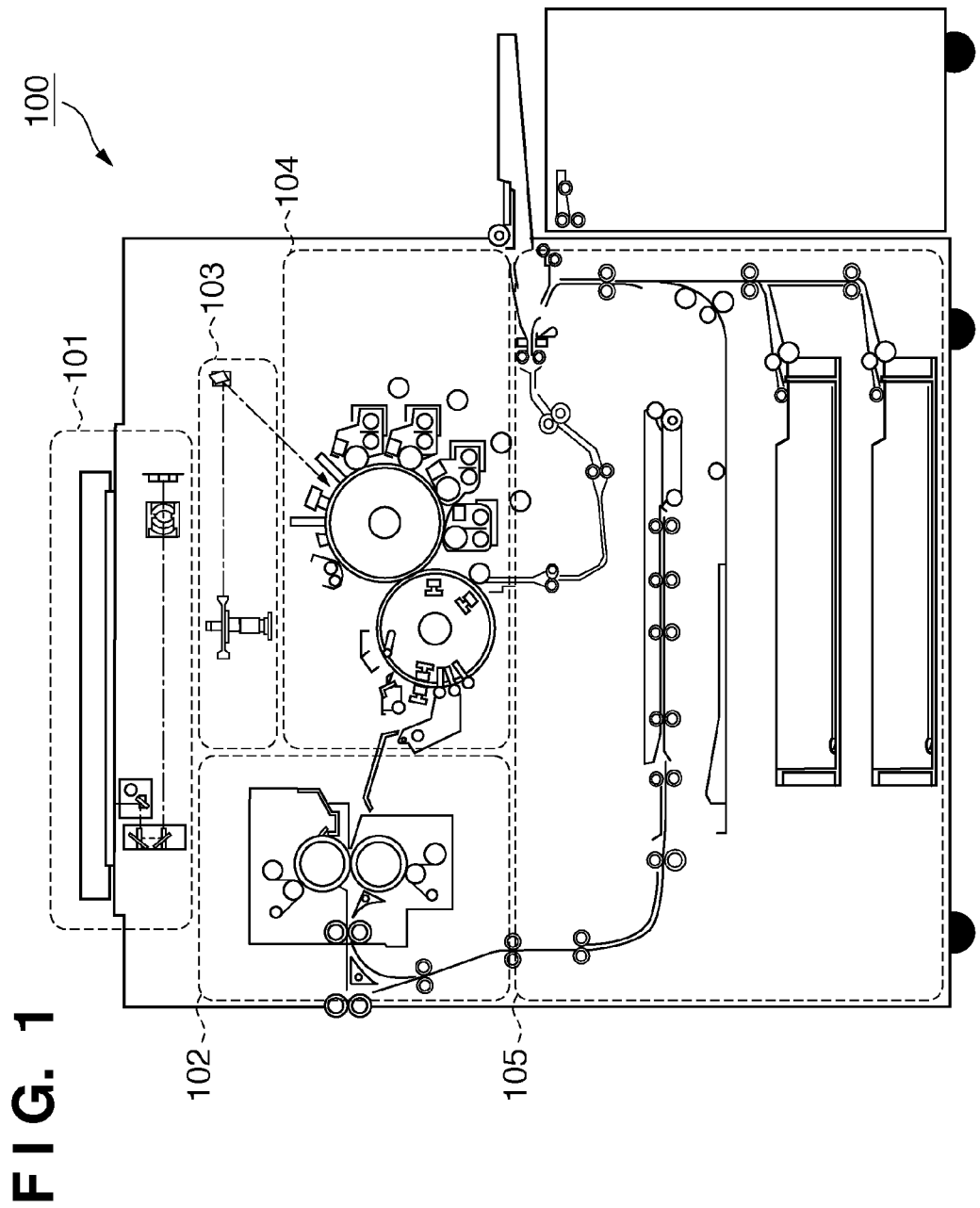
FIG. 1 is a cross-sectional view showing a configuration example of an MFP 100 according to a first embodiment.

FIG. 1 is a cross-sectional view showing a configuration example of an MFP 100 according to a first embodiment. The MFP 100 is provided with a scanner unit 101, a laser exposure unit 103, an image forming unit 104, a fixing unit 102, and a feed-conveyance unit 105.

The scanner unit 101 optically reads an image of an original by directing lighting onto the original placed on an original platform, then converts the image to electrical signals to generate image data. The laser exposure unit 103 causes a light beam, such as a laser light modulated in response to the image data, to be incident on a rotating polygonal mirror that rotates with an equiangular velocity, and irradiates this as a reflected scanning light onto a photosensitive drum.

The image forming unit 104 executes a series of electrophotographic processes to perform image forming: the image forming unit 104 rotationally drives the photosensitive drum and charges it using a charger, then a latent image formed on the photosensitive drum by the laser scanning unit 103 is developed by a toner and the toner image is transferred to a sheet, and a minute amount of toner that is left on the photosensitive drum without being transferred at this time is recovered. At this time, the sheet adheres to a predetermined position of a transfer belt and the aforementioned electrophotographic processes are repetitively executed in order during four rotations switching between developing units (developing stations) having toner of magenta (M), cyan (C), yellow (Y), and black (K) respectively. After the four rotations, the sheet onto which a full color toner image of four colors has been transferred is separated from a transfer drum and transported to the fixing unit 102.

The fixing unit 102 is constituted by a roller and belt combination, has an inbuilt heat source such as a halogen heater, and uses heat and pressure to fuse and fix the toner on the sheet onto which the toner image has been transferred by the image forming unit 104.

The feed-conveyance unit 105 has one or more sheet storage cabinets as exemplified by sheet cassettes or paper decks and, in response to an instruction from a printer controller, separates one sheet from among the plurality of sheets stored in the sheet storage cabinets and transports this to the image forming unit 104 and the fixing unit 102. The sheet adheres to the transfer drum of the image forming unit 104 and is transported to the fixing unit 102 after four rotations. During the four rotations, the toner images of the aforementioned four colors YMCK are transferred to the sheet. Furthermore, when forming images on both sides of the sheet, control is performed such that after the sheet passes through the fixing unit 102, it travels on a transport path to be transported again to the image forming unit 104.

The printer controller communicates with an MFP controller that performs overall control of the MFP, and executes control in response to instructions from the MFP controller. Further still, the printer controller manages the statuses of the various units such as the aforementioned scanner unit 101, laser exposure unit 103, image forming unit 104, fixing unit 102, and the feed-conveyance unit 105.

<Control Unit Configuration>

Figure 2:
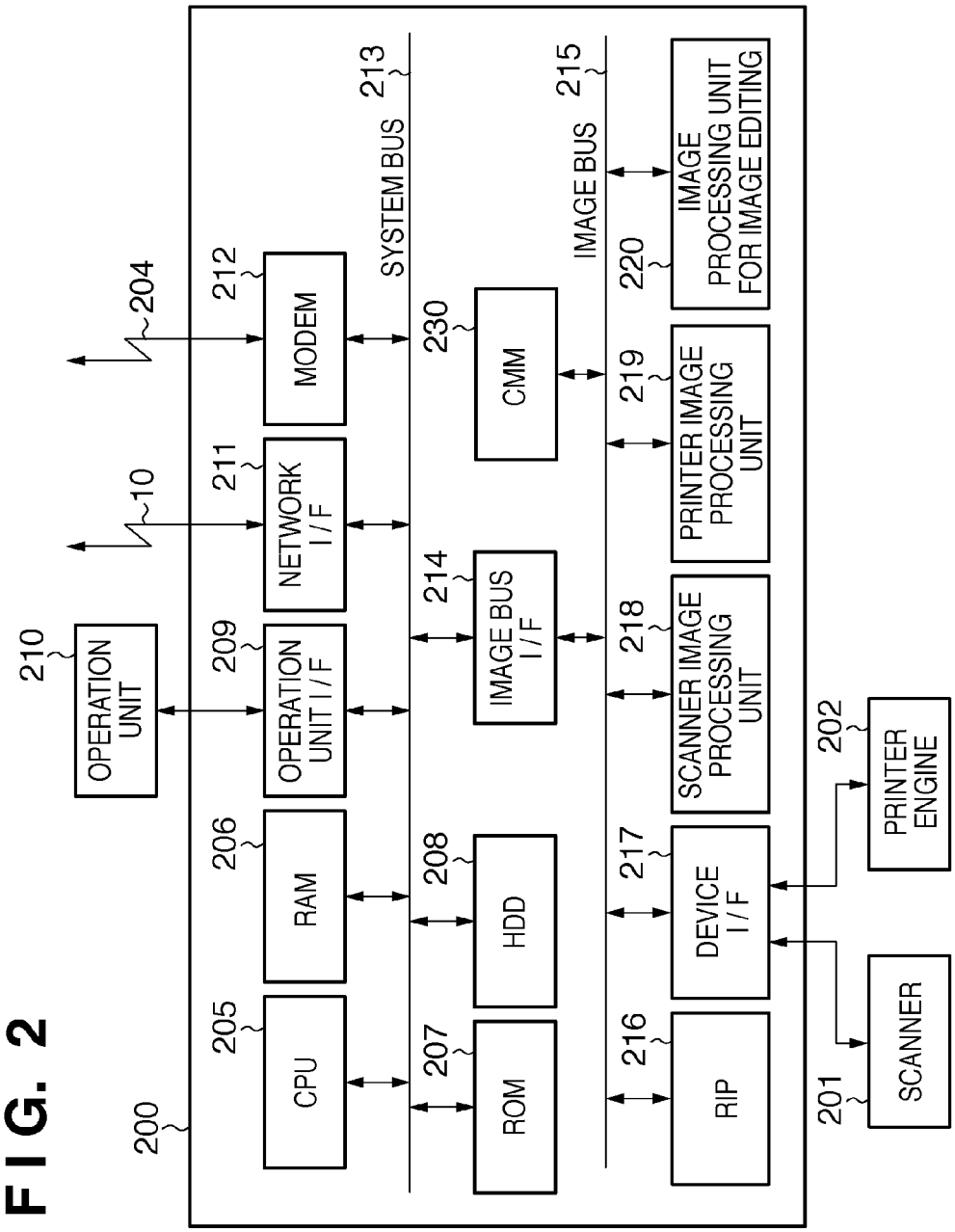
FIG. 2 is a block diagram showing a hardware configuration of a control unit 200 according to the first embodiment.

FIG. 2 is a block diagram showing a hardware configuration of a control unit 200 according to the first embodiment. The control unit 200 provided in the MFP 100 is connected to a scanner 201, which is an image input device, and a printer engine 202, which is an image output device, and carries out control for reading image data and printer output. Furthermore, by connecting to a LAN 10 or a public network 204, the control unit 200 carries out control for performing input and output of image information and device information via the LAN 10 or the public network 204.

The control unit 200 is provided with a CPU 205, a RAM 206, a ROM 207, a HDD 208, an operation unit I/F 209, an operation unit 210, a network I/F 211, a modem 212, a system bus 213, an image bus I/F 214, and an image bus 215. Further still, the control unit 200 is provided with a raster image processor (RIP) 216, a device I/F 217, a scanner image processing unit 218, a printer image processing unit 219, an image processing unit 220 for image editing, and a color management module (CMM) 230.

The CPU 205 is a central processing unit for performing overall control of the MFP 100. Furthermore, as a characteristic configuration of the present invention, the CPU 205 functions as a generation unit, a determination unit, a first storage unit, a second storage unit, a search unit, a first display control unit, a second display control unit, a confirmation unit, and an update unit. Each of these units is described later.

The RAM 206 is a system work memory for enabling the CPU 205 to work, and is also an image memory for temporarily storing input image data. Further still, the ROM 207 is a boot ROM on which is stored a boot program of the system. The HDD 208 is a hard disk drive that stores system software for various processes and image data that has been input. The operation unit I/F 209 is an interface unit for the operation unit 210 having a display device capable of displaying image data and the like, and outputs operation screen data to the operation unit 210. Furthermore, the operation unit I/F 209 performs a role of transmitting information that has been input by an operator from the operation unit 210 to the CPU 205. The network interface 211 is realized by a LAN card or the like for example, and connects to the LAN 10 to carry out input and output of information with the external device. And the modem 212 connects to the public network 204 to carry out input and output of information with the external device. These units are arranged on the system bus 213.

The image bus I/F 214 is an interface for connecting the system bus 213 and the image bus 215, by which image data is transferred at high speeds, is a bus bridge that performs data structure conversions. Connected on the image bus 215 are the raster image processor 216, the device I/F 217, the scanner image processing unit 218, the printer image processing unit 219, the image processing unit 220 for image editing, and the CMM 230.

The RIP 216 renders page description language (PDL) code and vector data to be described later into an image. The device I/F section 217 connects the scanner 201 and the printer engine 202 to the control unit 200 and carries out conversions of image data of synchronous systems and asynchronous systems.

Furthermore, the scanner image processing unit 218 carries out various processes such as corrections, processing, and editing on image data that has been input from the scanner 201. The printer image processing unit 219 carries out processes such as corrections and resolution conversions on the image data to undergo printing output in accordance with the printer engine 202. The image processing unit 220 for image editing carries out various types of image processing such as rotation of the image data as well as compression and decompression processing of the image data. The CMM 230 is a specialized hardware module that executes color conversion processing (also referred to as color space conversion processing) on the image data based on profiles and calibration data. Profiles are information such as functions for converting color image data expressed in a device-dependent color space to a device-independent color space (such as Lab for example). Calibration data is data for modifying color reproduction characteristics of the scanner 201 and the printer engine 202 in a color multifunction peripheral 3.

<Controller Software Configuration>

Figure 3:
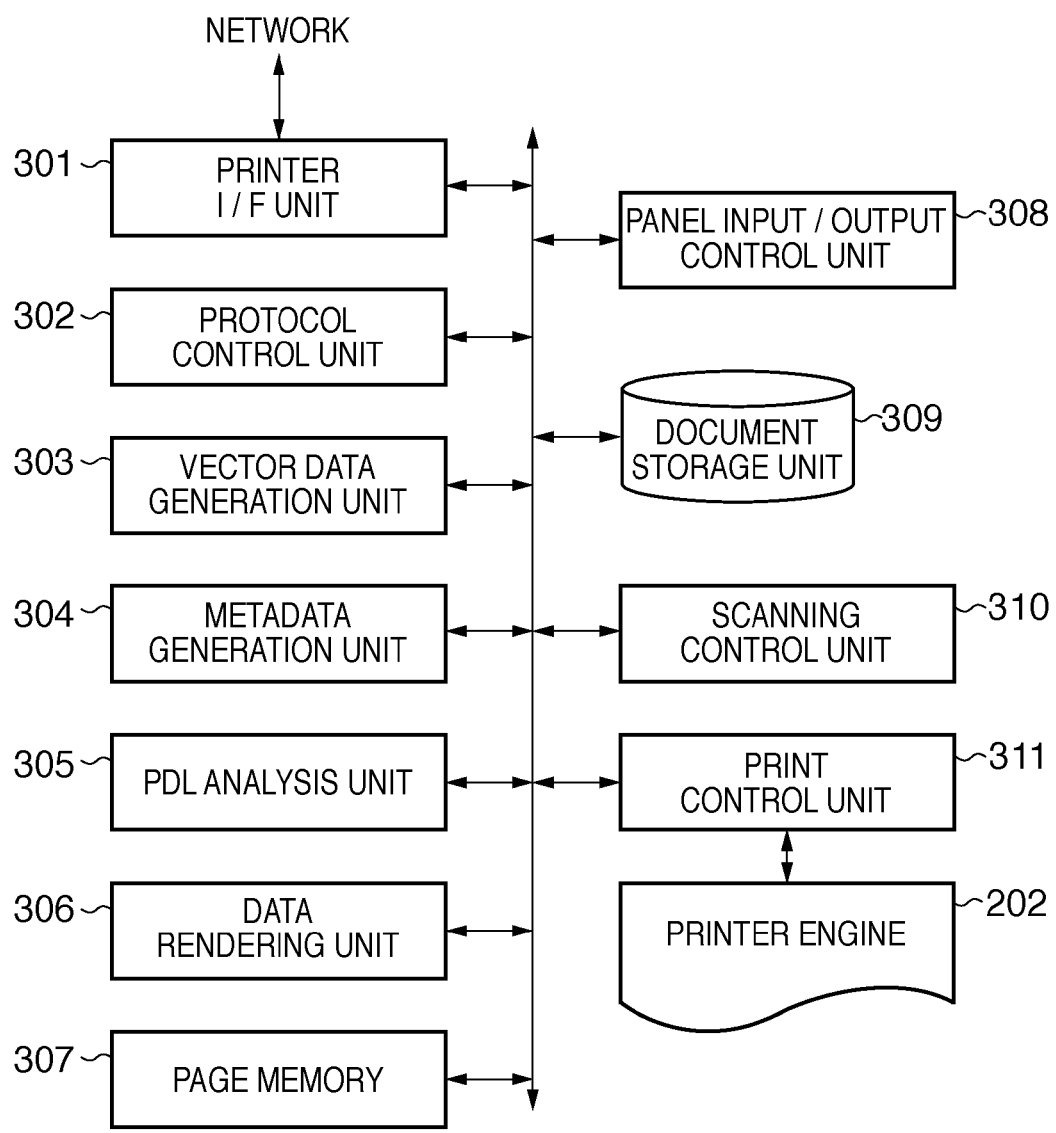
FIG. 3 is a block diagram showing a software configuration of the control unit 200 according to the first embodiment.

FIG. 3 is a block diagram showing a software configuration of the control unit 200 according to the first embodiment. Here, description is given mainly regarding control blocks relating to the present invention. However, the control blocks of the control unit 200 are not limited to the configuration shown in FIG. 3, and a configuration in which other control blocks are included is also possible.

Provided in the control unit 200 are a printer I/F unit 301, a protocol control unit 302, a vector data generation unit 303, a metadata generation unit 304, a PDL analysis unit 305, and a data rendering unit 306. Further still, a panel input/output control unit 308, a scanning control unit 310, and a print control unit 311 are also provided in the control unit 200. Furthermore, a page memory 307 and a document storage unit 309 are connected to the control unit 200.

The printer I/F unit 301 controls input and output that is performed in relation to external portions. The protocol control unit 302 controls communication that is performed in relation to external portions by analyzing and sending network protocols.

The vector data generation unit 303 generates (vectorizes) vector data, which is a resolution-independent rendering description from a bitmap image.

The metadata generation unit 304 generates as metadata secondary information that is obtained in the vectorizing process. Metadata indicates data (additional information) that has been added for searching and is not necessary to the rendering process.

The PDL analysis unit 305 analyzes PDL data and converts this to intermediate code (DL: DisplayList) of a format that is more easily processed. The intermediate code generated by the PDL analysis unit 305 is sent to the data rendering unit 306 to be processed. The data rendering unit 306 renders the aforementioned intermediate code into bitmap data and the rendered bitmap data is successively rendered in the page memory 307. The page memory 307 is a volatile memory for temporarily storing the bitmap data rendered by the renderer.

The panel input/output control unit 308 controls input and output from the operation panel.

The document storage unit 309 is a unit that stores data files containing vector data, DisplayLists, and metadata in group (job) units of input documents, and is realized by a secondary storage device such as a hard disk. It should be noted that in the present embodiment these data files are referred to as "documents".

The scanning control unit 310 carries out various processes such as corrections, processing, and editing on image data that has been input from the scanner. The print control unit 311 converts the content of the page memory 307 to video signals, and carries out image transfer to the printer engine 202. The printer engine 202 is a printing system unit for visualizing the received video signals on recording paper by forming a visible image.

<Data Processing of Control Unit>

Figure 4:
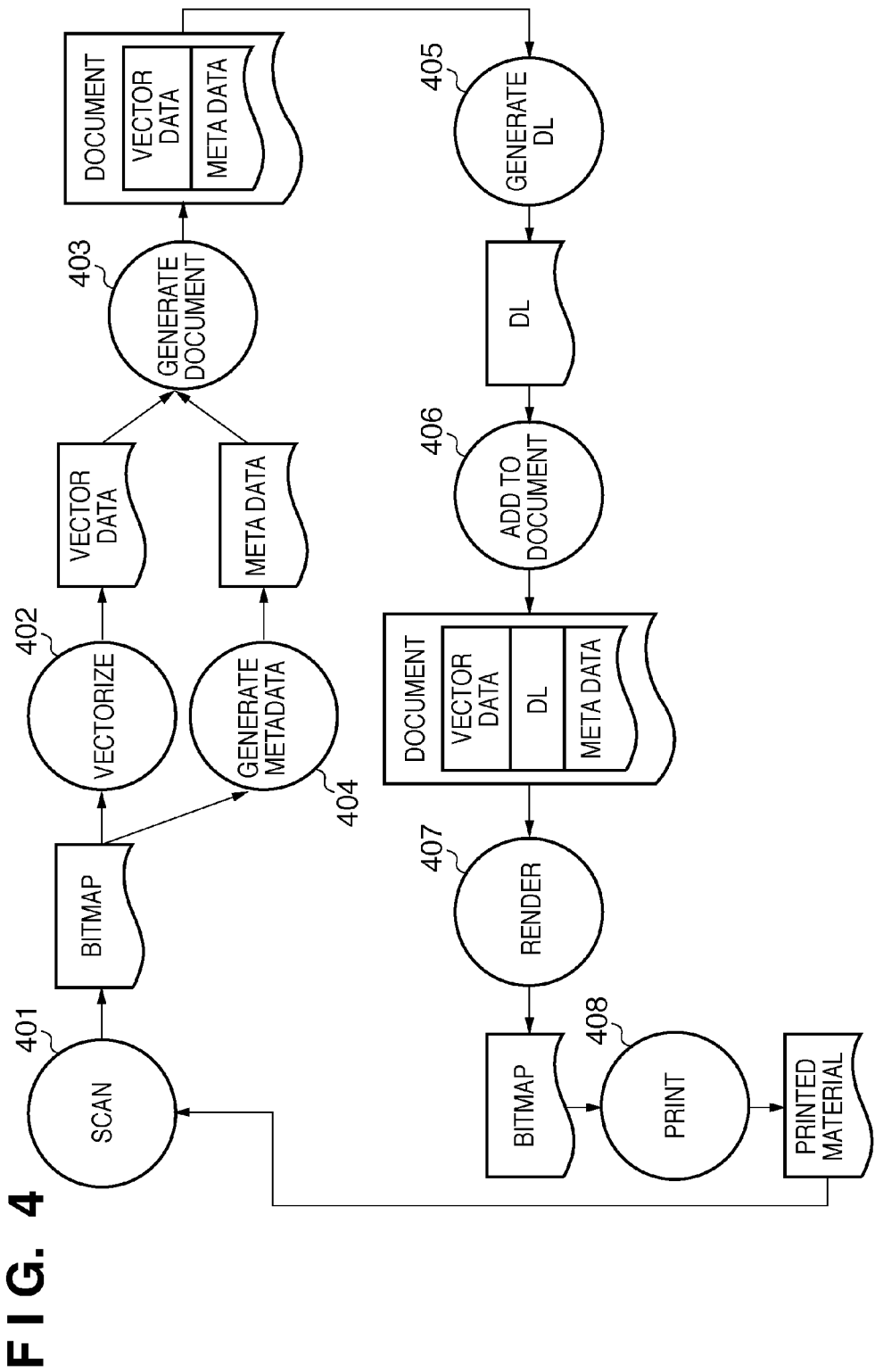
FIG. 4 is a diagram showing a flow of data in the control unit 200 according to the first embodiment.
Figure 5:
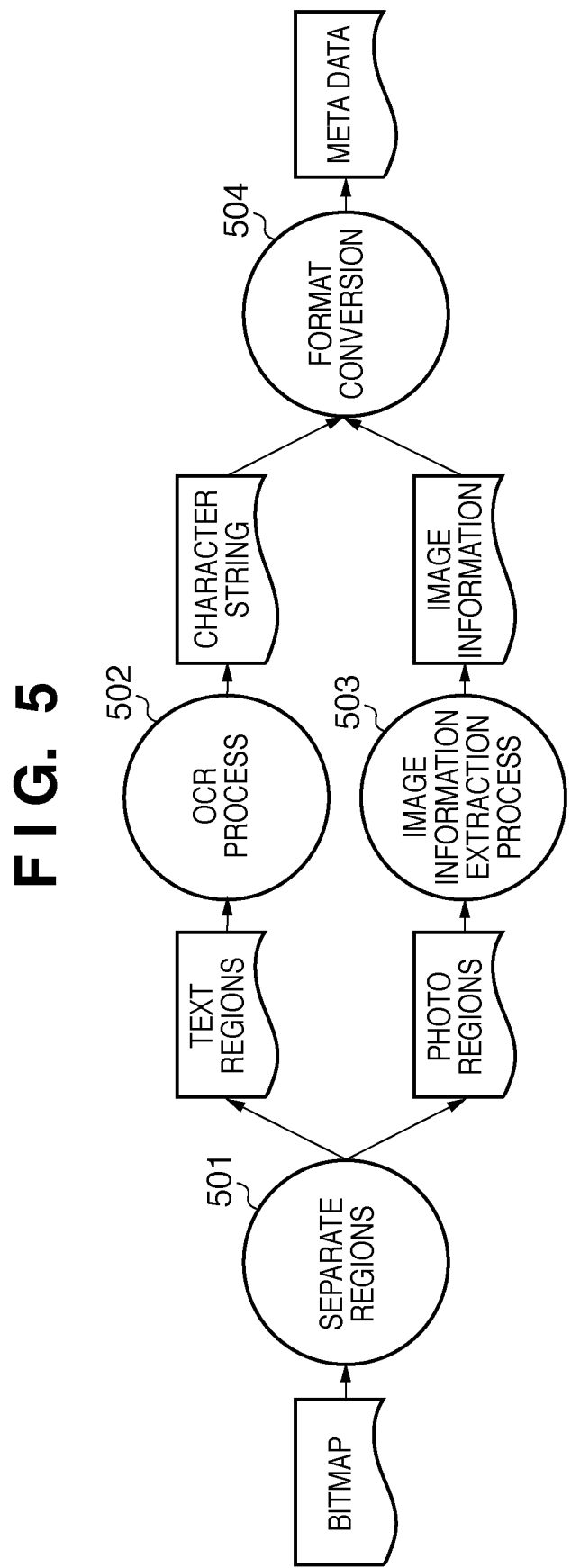
FIG. 5 is a diagram showing a flow of data in the control unit 200 according to the first embodiment.
Figure 6:
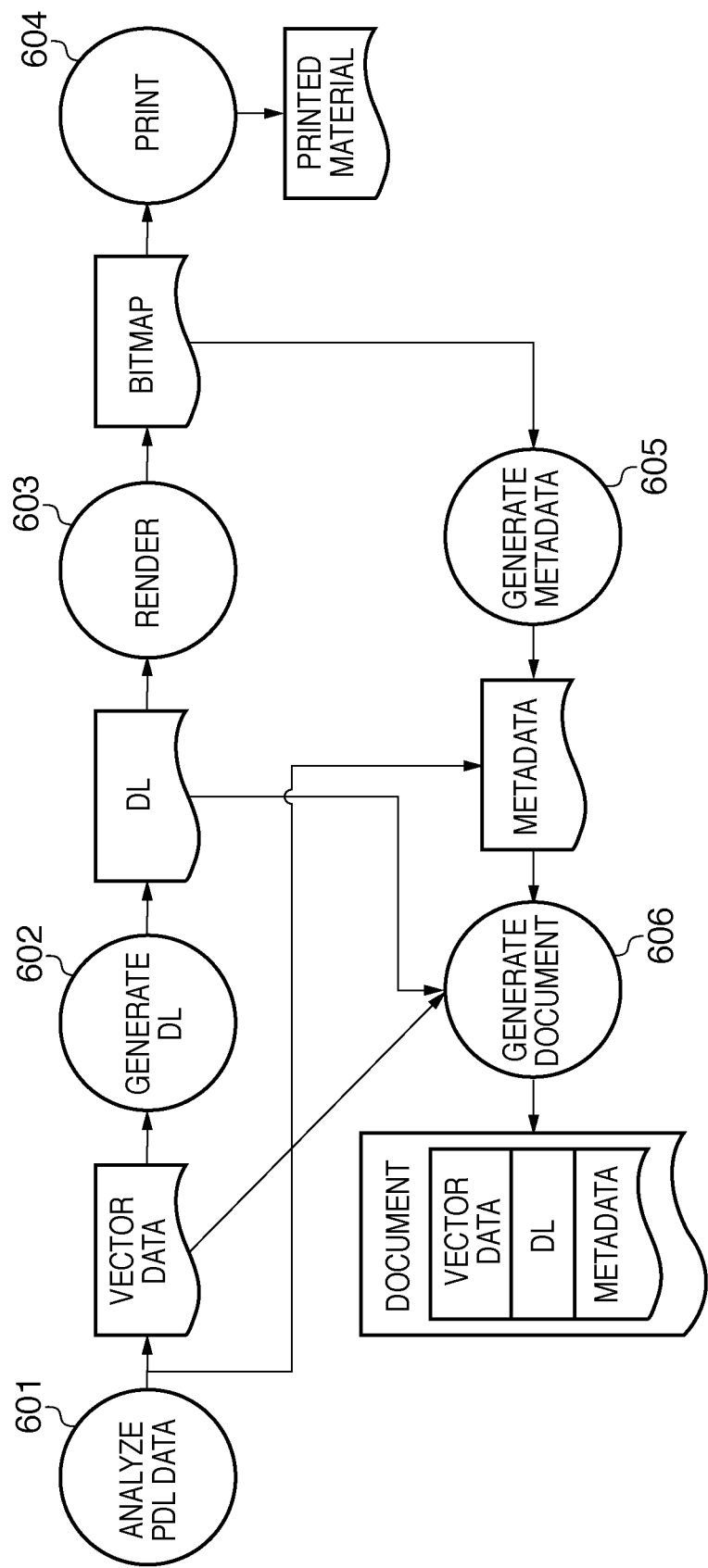
FIG. 6 is a diagram showing a flow of data in the control unit 200 according to the first embodiment.

Next, description is given with reference to FIG. 4 through FIG. 7 regarding a manner in which vector data, DL, and metadata that constitute a document are generated. FIG. 4 through FIG. 6 are diagrams showing a flow of data in the control unit 200 according to the first embodiment.

FIG. 4 shows a flow of data during a copy operation. First, a paper original that has been set in the original exposure unit is converted to bitmap data by a scanning process 401. Next, through a vectorizing process 402 and a metadata generating process 404, resolution-independent vector data and metadata accompanying this are generated respectively from the bitmap data. Specific generation methods of the vector data and the metadata are described later.

Next, through a document generation process 403, a document is generated in which the vector data and the metadata are associated. Following this, through a DL generation process 405, a DL is generated from the vector data in the document. The generated DL is stored within the document through an addition to document process 406 and sent to a rendering process 407 to be rendered as a bitmap.

The rendered bitmap is recorded on a paper medium through a printing process 408 and becomes a printed material. It should be noted that by again setting the output printed material in the original exposure unit, processing can be carried out from the scanning process 401.

FIG. 5 shows a specific flow of data of the metadata generation process 404 shown in FIG. 4. First, data is separated into regions from the bitmap in a region separation process 501. Region separation is a process in which input bitmap image data is analyzed and separated into regions for each group of objects contained in the image, then attributes of each region are determined to perform classification. Types of attributes include characters (TEXT), images (PHOTO), lines (LINE), diagrams (PICTURE), tables (TABLE), and the like.

Figure 7:
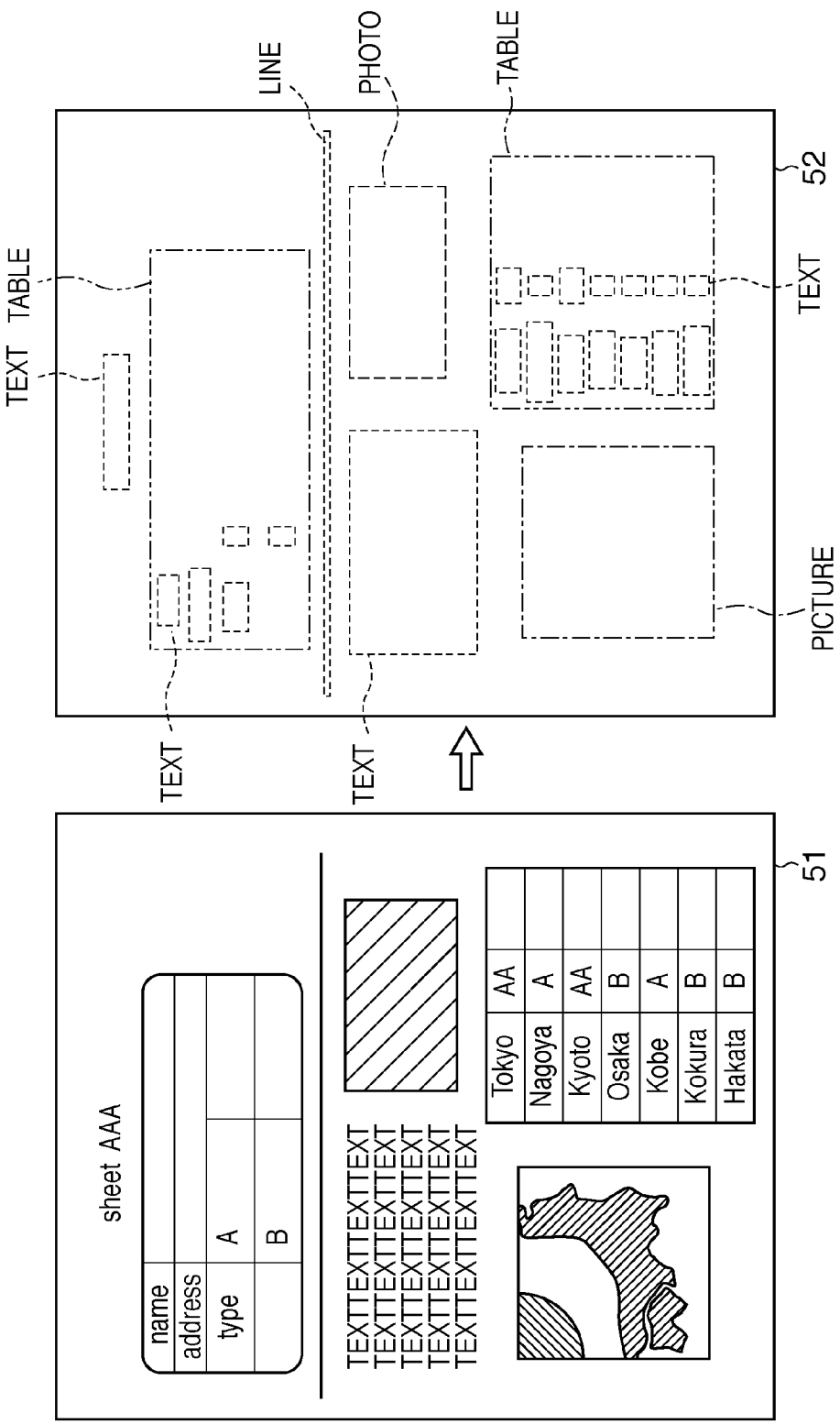
FIG. 7 is a diagram showing one example of a case where region separation has been carried out on an input image.

Here, description is given of one example of region separation with reference to FIG. 7. FIG. 7 is a diagram showing one example of a case where region separation has been carried out on an input image. A determination result 52 is a result of region separation being carried out on an input image 51. In the determination result 52, areas surrounded by dotted lines indicate single units of an object of the result in which the image was analyzed, and a type of attribute assigned to each of the objects is a determination result of region separation.

Description now proceeds returning to FIG. 5. Regions having a text attribute among the regions separated according to each attribute undergo a character recognition process through an OCR process 502 and are converted to character strings. That is, the character strings are character strings that are printed on the paper surface.

On the other hand, regions having a photo attribute among the regions separated according to each attribute are converted to image information through an image information extraction process 503. Image information refers to a character string that expresses a feature of the photo, for example, a character string that indicates "flower" or "face". Ordinary image processing techniques such as detection of image feature quantities (such as the frequency or density of pixels that constitute the image) or face recognition can be used in the extraction of image information.

Through a format conversion process 504, the generated character strings and image information are arranged into a data format to be described later, and metadata is generated.

FIG. 6 shows a flow of data during PDL (page description language) printing. PDL printing refers to a printer operation in which when printing is instructed from an application on the PC, page description language (PDL) generated by a printer driver on the PC is received and output.

First, the received PDL data is analyzed through a PDL data analysis process 601 and vector data is generated. Next, through a DL generation process 602, a DL is generated from the vector data. The generated DL is stored within the document and sent to a rendering process 603 to be rendered as a bitmap. The rendered bitmap is recorded on a paper medium through a printing process 604 and becomes a printed material. The vector data and DL generated through these processes are stored in a document through a document generation process 606.

Further still, through a metadata generation process 605 (shown as the same process as the process described in FIG. 5), character strings and image information is generated as metadata from the bitmap generated in the rendering process 603 in the same manner as during the copy operation, then stored in a document.

Furthermore, although there are various types of PDL such as LIPS (LBP Image Processing System) and PS (PostScript), there is PDL data that contains character string information. In this case, metadata is generated from the character strings during the analysis of the PDL data and stored in a document.

Figure 8:
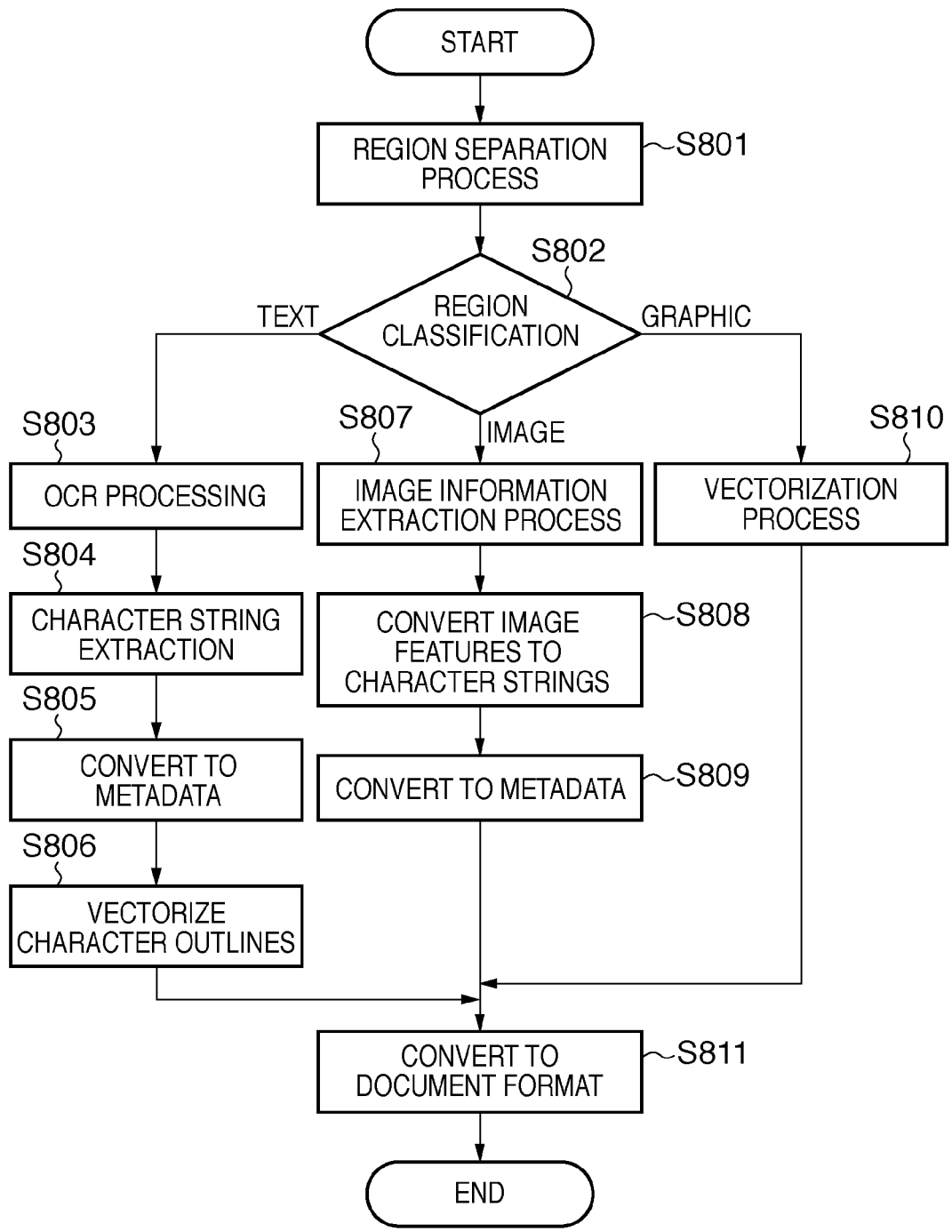
FIG. 8 is a flowchart showing a processing procedure of a document generation process according to the first embodiment.

Next, description is given with reference to FIG. 8 regarding a document generation process and a printing process. FIG. 8 is a flowchart showing a processing procedure of a document generation process according to the first embodiment. Document generation process indicates a process of receiving bitmap data and generating a document constituted by vector data, a DL, and metadata. The process described below is executed by the CPU 205 of the control unit 200 or by any of the units within the control unit 200 under the control of the CPU 205.

First, at step S801, the CPU 205 carries out the above-described region separation process. Next, at step S802, the CPU 205 classifies the regions according to type (attribute) into TEXT, GRAPHIC, and IMAGE, then carries out processing separately for each of these respectively. Although FIG. 7 shows an example in which the attributes are classified into TEXT, PHOTO, LINE, PICTURE, and TABLE, here, of the attributes shown in FIG. 7, PHOTO and PICTURE are classified into IMAGE, and LINE and TABLE are classified into GRAPHIC.

When the region attribute is TEXT, the CPU 205 causes the process to transition to step S803. At step S803, the CPU 205 executes OCR processing, then at step S804, the CPU 205 carries out character string extraction. Further still, at step S805, the CPU 205 converts the character strings to metadata then causes the process to transition to step S806 and converts outlines of the recognized text to vector data.

The metadata generated from the aforementioned character strings is a sequence of character codes. Furthermore, the sequence of character codes is information that is necessary in keyword searches. However, although character codes can be recognized in OCR processing, it is not possible to recognize fonts such as "Mincho" and "Gothic," font sizes such as "10 pt" and "12 pt," or text styles such as "italics" and "bold". Accordingly, it is necessary to store character outlines as vector data, rather than using character codes in rendering.

When the region attribute is IMAGE at step S802, the CPU 205 causes the process to transition to step S807 to carry out a process of extracting image information.

At step S807, the CPU 205 uses ordinary image processing techniques such as image feature quantity detection and face recognition to detect features of the image. Following this, at step S808, the CPU 205 converts the detected image features to character strings. This conversion can be carried out easily by storing a table of feature parameters and character strings. After this, at step S809, the CPU 205 converts the character strings to metadata.

In this way, vectorization is not carried out on the region attributes of IMAGE, but the image data is stored as it is as vector data.

When the region attribute is GRAPHIC at step S802, the CPU 205 causes the process to transition to step S810 to carry out a vectorization process.

Figure 9:
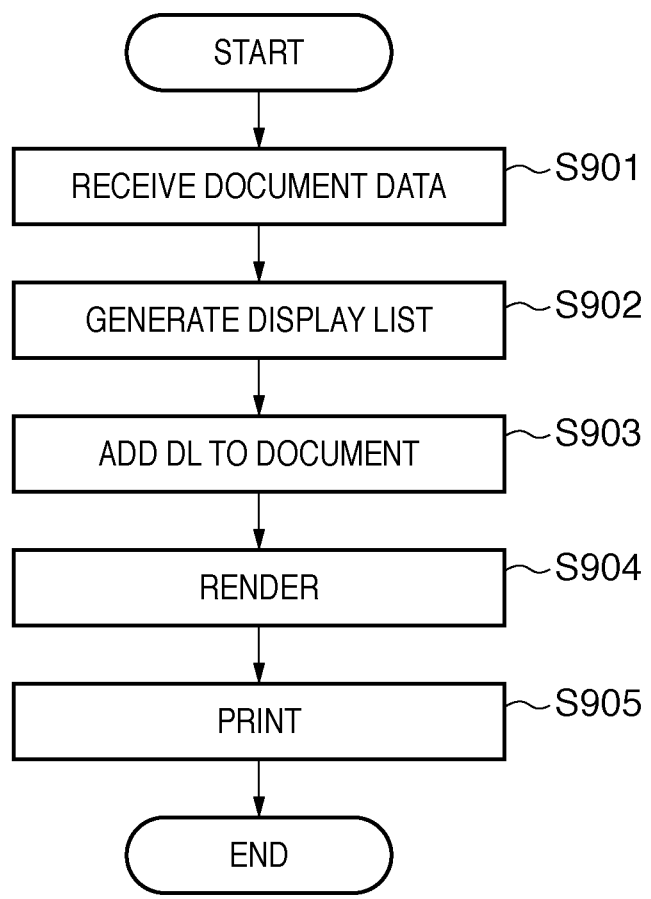
FIG. 9 is a flowchart showing a processing procedure of a document printing process according to the first embodiment.

Next, description is given with reference to FIG. 9 regarding a document printing process. FIG. 9 is a flowchart showing a processing procedure of a document printing process according to the first embodiment. The document printing process is a process in which print output is performed on the generated document. The process described below is executed by the CPU 205 of the control unit 200 or by any of the units within the control unit 200 under the control of the CPU 205.

First, at step S901, the CPU 205 receives the document data. Next, at step S902, the CPU 205 generates a DL from the vector data in the document. Next, at step S903, the CPU 205 adds the generated DL to the document and at step S904 it renders the DL into a bitmap. Finally, at step S905, the CPU 205 carries out print processing to the paper medium and processing is finished.

Figure 10:
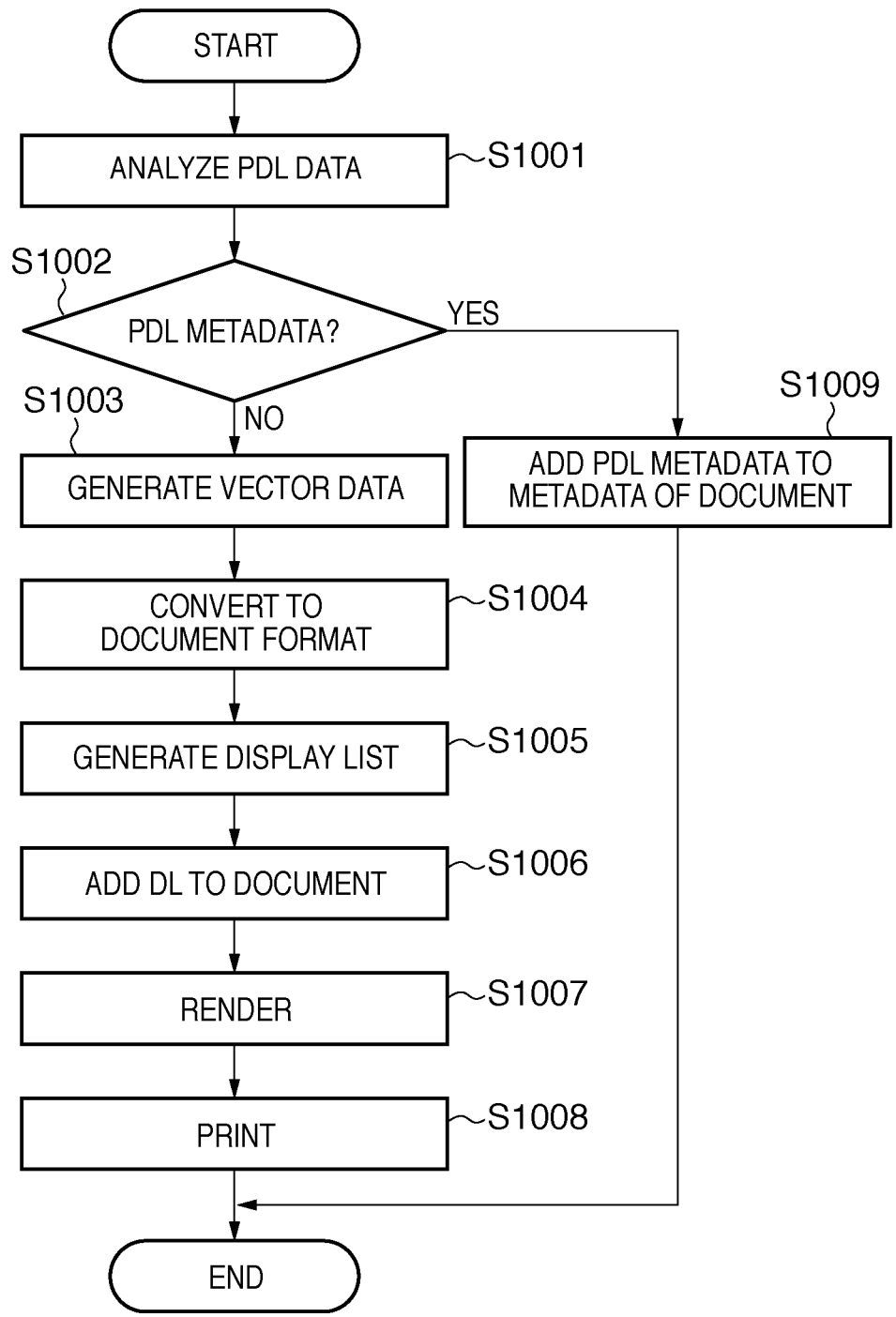
FIG. 10 is a flowchart showing a processing procedure of a process of generating and printing a document according to the first embodiment.

Next, description is given with reference to FIG. 10 regarding a process of generating and printing a document from the PDL. FIG. 10 is a flowchart showing a processing procedure of a process of generating and printing a document according to the first embodiment. The process of generating and printing the document is a process in which PDL data is received to generate a document, and print output is performed. The process described below is executed by the CPU 205 of the control unit 200 or by any of the units within the control unit 200 under the control of the CPU 205.

First, at step S1001, the CPU 205 analyzes the PDL data. Further still, at step S1002, during analysis of the PDL data, the CPU 205 determines whether or not metadata such as character string information is contained in the PDL data. When metadata is contained there, the CPU 205 causes the process to transition to step S1009, and information of the PDL is added to the metadata.

On the other hand, regarding data at step S1002 other than metadata such as character string information, after the procedure has proceeded to step S1003 and this has been converted to vector data, the procedure proceeds to step S1004 and a document is generated. Next, at step S1005, the CPU 205 generates a DL, then the procedure proceeds to step S1006 and the DL that has been generated is added to the document. The process of generating the document is completed by the flow up to here. After this, at step S1007 and S1008, the CPU 205 executes the rendering process, carries out print processing to the paper medium, and all the processing is finished.

<Document Data Structure>

Figure 11:
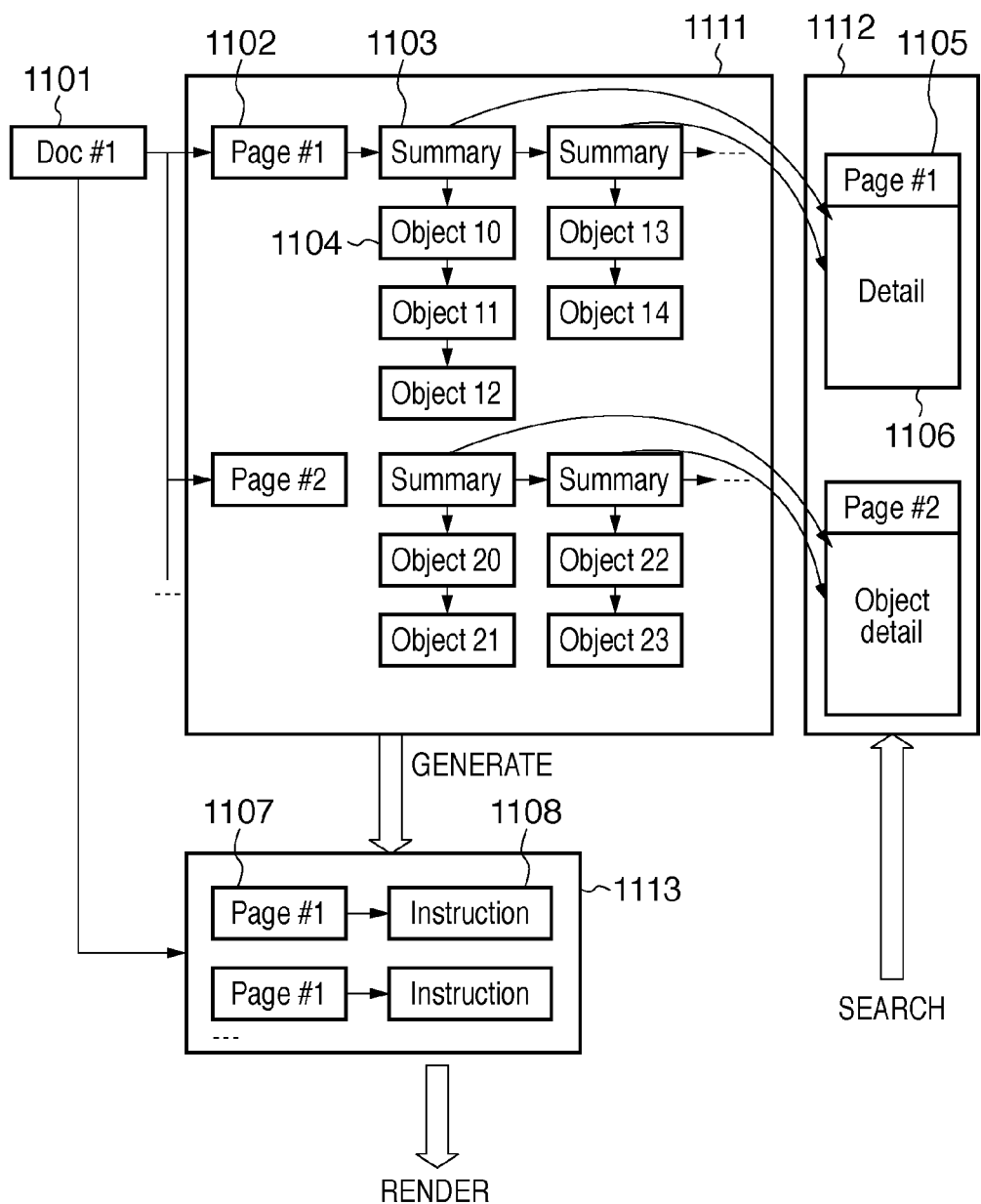
FIG. 11 is a diagram showing a document structure according to the first embodiment.
Figure 12:
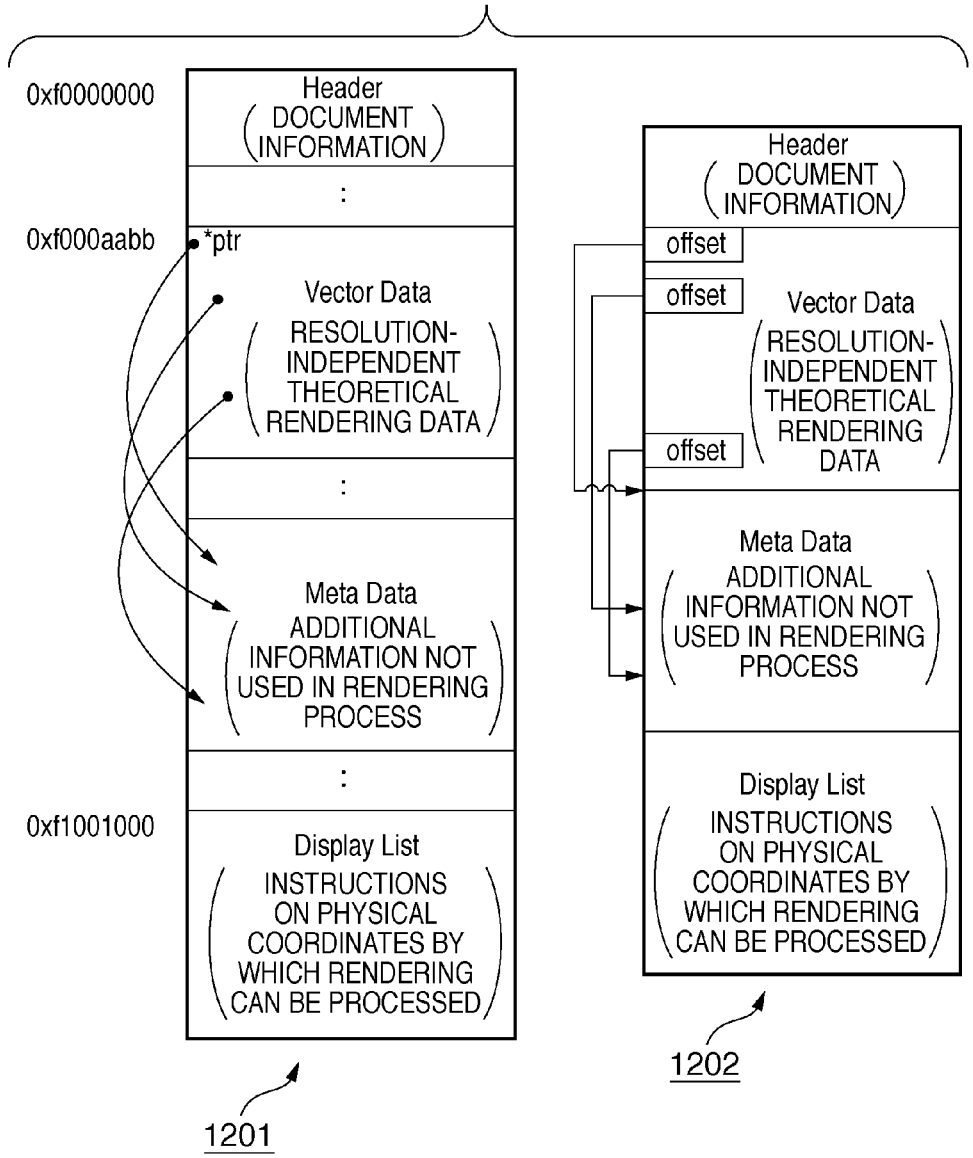
FIG. 12 is a diagram showing a document structure according to the first embodiment.
Figure 13:
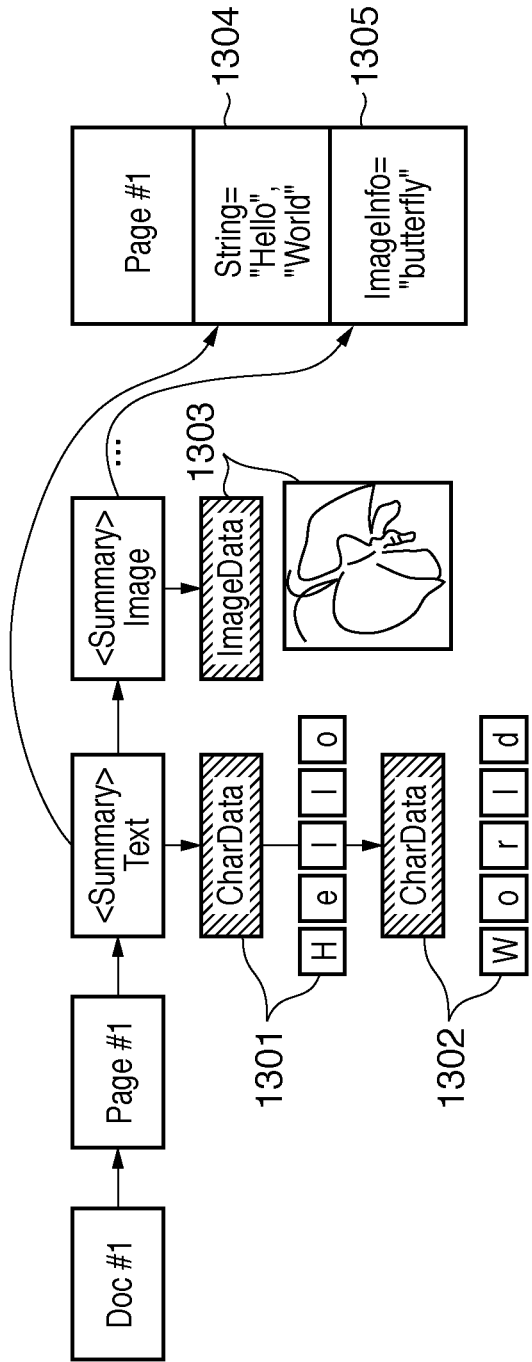
FIG. 13 is a diagram showing a document structure according to the first embodiment.

Next, description is given with reference to FIG. 11 through FIG. 13 regarding a structure of the document. FIG. 11 through FIG. 13 are diagrams showing a document structure according to the first embodiment.

FIG. 11 shows a data structure of a document. The document is data made up of a plurality of pages and broadly divided is constituted by vector data 1111, metadata 1112, and a DL 1113, and has a hierarchical structure, the forefront of which is a document header 1101.

The vector data 1111 further includes a page header 1102, summary information 1103, and objects 1104. Furthermore, the metadata 1112 further includes page information 1105 and detailed information 1106. The DL 1113 further includes a page header 1107 and an instruction 1108 for rendering. Since a storage location of the vector data and a storage location of the DL are described in the document header 1101, the vector data and the DL are associated in the document header 1101.

The vector data 1111 is resolution-independent data that is not dependent on the printing resolution. Accordingly, layout information such as page size and orientation is described in the page header 1102. Rendering data such as lines, polygons, Bezier curves, and the like is linked in each of the objects 1104 and multiple objects are collectively associated in the summary information 1103. The summary information 1103 summarizes and expresses features of multiple objects, and described therein is attribute information or the like of separated regions as described in FIG. 7.

The metadata 1112 is additional information for searching and is unrelated to rendering processes. For example, page information indicating whether the metadata has been generated from bitmap data or whether it has been generated from PDL data is included in the page information 1105 region. And character strings (character code strings) generated as OCR information or image information is included in the detailed information 1106.

Furthermore, metadata is referenced from the summary information 1103 of the vector data 1111 and it is possible to discover the detailed information 1106 from the summary information 1103.

The DL 1113 is an intermediate code for the renderer to render a bitmap. Management tables or the like of rendering information (instructions) in the page are described in the page header 1107. Furthermore, resolution-dependent rendering information is included in the instruction 1108.

FIG. 13 shows a specific example of document data. In the example shown in FIG. 13, summary information of a first page has "TEXT" and "IMAGE". Furthermore, character outlines of H, e, l, l, and o (object 1301) and W, o, r, l, and d (object 1302) are linked as vector data in the summary information of "text".

Further still, character code strings (metadata 1304) of "Hello" and "World" are referenced from the summary information. Furthermore, a photo image (JPEG) 1303 of a butterfly is linked in the summary information of "image". Furthermore, image information (metadata 1305) of "butterfly" is referenced from the summary information.

Accordingly, when searching the text in the page using a search keyword of "World" for example, detection is performed with the following procedure. First, sets of the vector page data are obtained in order from the document headers, then metadata linked to "TEXT" is searched from the summary information, which is linked to the page header.

FIG. 12 shows a manner in which the data structure described in FIG. 11 is arranged in the memory and in files. Numeral 1201 indicates contents of the memory and numeral 1202 indicates contents of the file.

As indicated by numeral 1201, a vector data region, a metadata region, and a DL region of the document are arranged at arbitrary addresses in the memory. On the other hand, as indicated by numeral 1202, the vector data region, metadata region, and DL region of the document are serialized into a single file.

<Document Merging Process>

Next, description is given with reference to FIG. 14 through FIG. 21 regarding a document merging process, which is a feature of the present invention. First, hereinafter description is given regarding an operation for storing documents to be merged in the box. Here, an example is shown of box storage using remote copying. Remote copying indicates an operation in which, for example, an original image read by an image processing apparatus is to undergo print output by another image processing apparatus. That is, this is a process in which the scanning operation and printing operation in the copying operation are carried out by different devices on the network.

FIG. 14 is a diagram showing one example of a display screen 1401 that is displayed to the operation unit 210 of the MFP 100. The display screen 1401 is displayed on the operation unit 210 of the image processing apparatus when an operator indicates remote copying. Furthermore, the display screen 1401 is displayed when a user (operator) has pressed a remote copy mode button 1402 on an operation screen.

When the operator presses a printer selection button 1403, a pull-down list is displayed of image processing apparatuses that can be specified as output locations for remote copying. The operator is able to select a desired image processing apparatus from this list. The name of the image processing apparatus selected by the operator is displayed in a display region indicated by numeral 1404. A list of remote devices capable of being specified as output locations for remote copying is stored in the device in advance.

Numeral 1405 indicates a box storage selection button for carrying out selection of storage to a box when remote copying is specified. The box storage selection button 1405 is toggle controlled such that it is selected when pressed once and deselected when pressed again. FIG. 14 shows the selected state. When remote copying is executed while box storage is selected, the data is stored in the box at the location of remote copying.

A scaling ratio specification button 1408 is a button for specifying a scaling ratio of magnification or reduction to be applied to the original image during remote copying. The scaling ratio of magnification or reduction specified by the operator is displayed on a display region 1409. A paper selection button 1406 is a button for selecting the paper on which print output is to be carried out. The size of the paper selected as the paper on which print output is to be carried out is displayed on a display region 1407. Here, "Auto" is selected, which indicates that the size of the original will be detected during scanning of the original and that an appropriate output paper will be selected automatically giving consideration to the scaling ratio of magnification or reduction specified by the operator.

A number of copies during remote copying is displayed in a display region 1410. The number of copies can be selected by the operator operating unshown hard keys. A finishing setting button 1411 is a button for carrying out finisher settings. By pressing the finishing setting button 1411, an unshown finisher setting screen is displayed and settings can be carried out relating to various types of finishing for the sheets of paper after printing such as sorting, stapling, and punching. A double-side specifying button 1412 is a button for specifying double-side copying. A supported function setting button 1413 is a button for carrying out settings of supported functions. By pressing the supported function setting button 1413, settings can be carried out for high-level supported functions of the multifunction peripheral, which includes settings such as "consecutive page shooting," "binding," and "reduced layout". A color mode setting button 1414 is a button for carrying out settings of the color modes.

Figure 15:
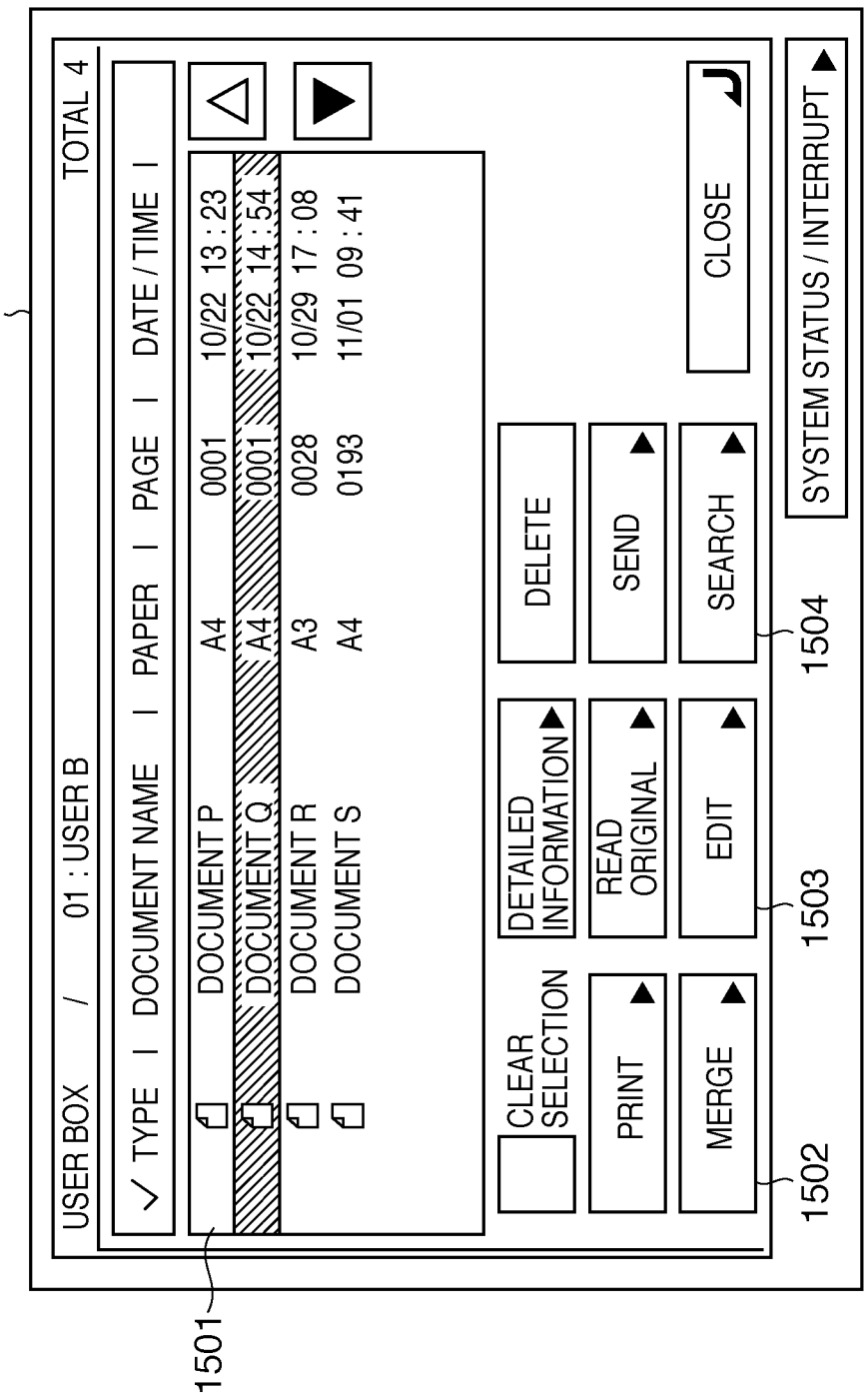
FIG. 15 is a diagram showing a display screen 1500 for performing document merging processes according to the first embodiment.

FIG. 15 is a diagram showing a display screen 1500 for performing document merging processes according to the first embodiment. The display screen 1500 shows one example of a screen to be displayed on the operation unit 210 for the operator to instruct the combination of files (documents) stored in the box.

Numeral 1501 indicates a display area for displaying a list of files stored within the box. Numeral 1502 indicates a merge button for instructing the merging of files. By the operator pressing the merge button 1502 while multiple files are selected on the screen of the display area 1501, the selected files are merged and a single file is generated.

Numeral 1503 indicates an edit button. When the edit button 1503 is pressed while a file is selected on the display area 1501, an arbitrary editing task is carried out and the file is updated. Numeral 1504 indicates a search button. In a case where the operator desires to search for a file, by pressing the search button 1504 and inputting an arbitrary character string, the files within the box are searched, and results are displayed as a list on the display area 1501.

Next, description is given with reference to FIG. 16 regarding an operation of a document (file) merging process. FIG. 16 is a flowchart showing an operation of a document merging process according to the first embodiment. The process described below is executed by the CPU 205 of the control unit 200 or by any of the units within the control unit 200 under the control of the CPU 205.

First, at step S1601, due to the operator pressing the document merge button 1502, the CPU 205 receives a document merging instruction. Further still, the CPU 205 displays a settings screen 1701 for setting the merging details on the operation unit 210.

At step S1602, the CPU 205 obtains settings from the operator through the settings screen 1701 relating to document merging. Further still, at step S1603, the CPU 205 executes the document merging process in accordance with the information that has been set via the settings screen 1701.

Figure 17:
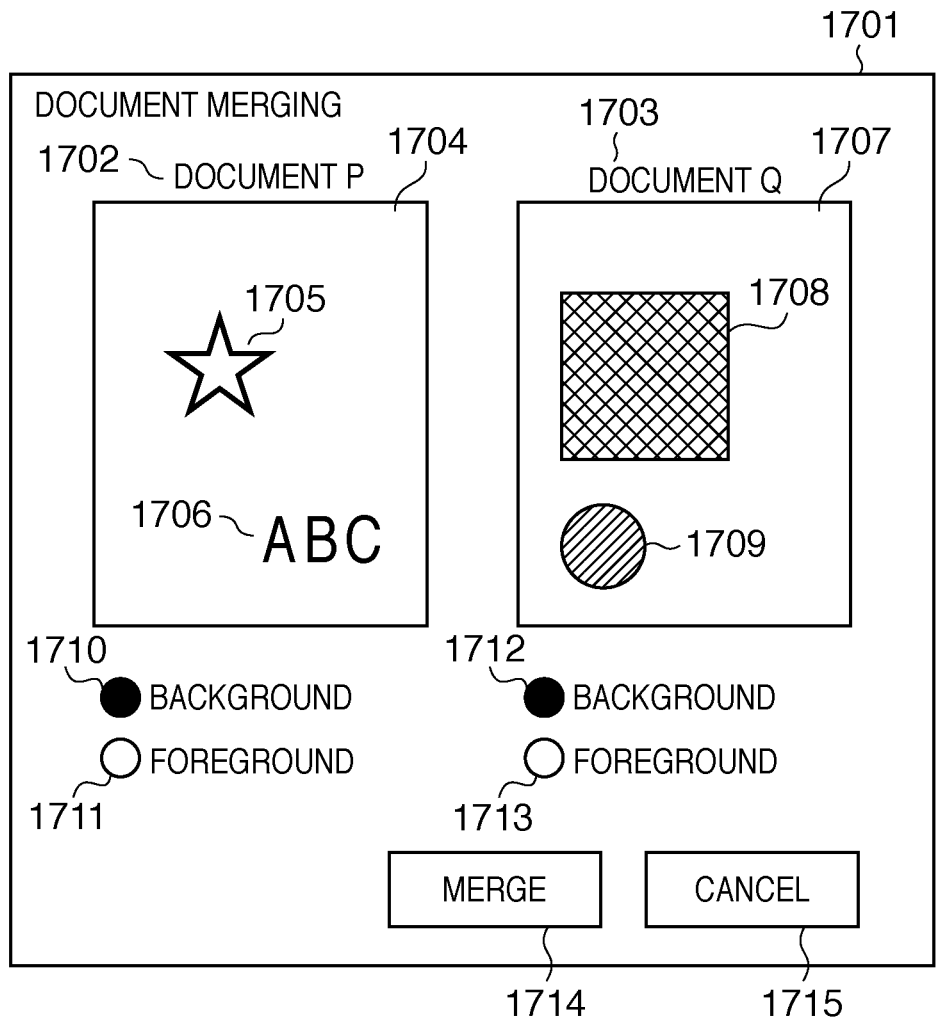
FIG. 17 is a diagram showing one example of a setting screen 1701 of document merging according to the first embodiment.

FIG. 17 is a diagram showing one example of the settings screen 1701 of document merging according to the first embodiment. By operating the settings screen 1701, the operator can perform settings on detailed instructions of document merging. Furthermore, the settings screen 1701 is displayed when the merge button 1502 of the display screen 1500 shown in FIG. 15 is pressed.

Numerals 1702 and 1703 indicate names of the documents to be merged. In the present embodiment, description is given using an example of merging a "document P" and a "document Q" shown in FIG. 17. Numeral 1704 indicates a preview of the document P and numeral 1707 indicates a preview of the document Q. Document P is configured including a star shaped object 1705 and a text object 1706 of "ABC". Document Q is configured including a rectangular object 1708 and a circular object 1709.

Numerals 1710, 1711, 1712, and 1713 indicate buttons for selecting whether the document is to be set as a foreground or a background. When the button 1710 is selected, the buttons 1711 and 1712 go into a deselected state and the button 1713 goes into a selected state. When the button 1711 is selected, the buttons 1710 and 1713 go into a deselected state and the button 1712 goes into a selected state. When the button 1712 is selected, the buttons 1710 and 1713 go into a deselected state and the button 1711 goes into a selected state. When the button 1713 is selected, the button 1710 goes into a selected state and the buttons 1711 and 1712 go into a deselected state. In FIG. 17, an example is shown in which the button 1710 is selected.

Figure 18:
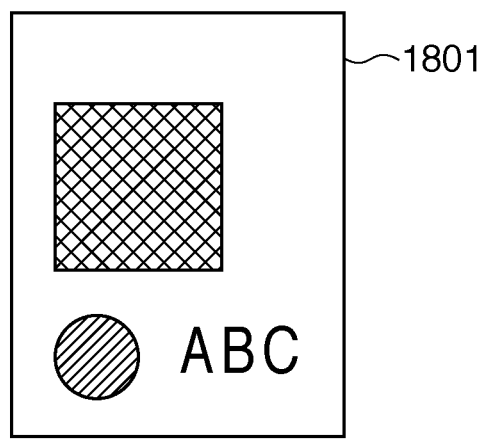
FIG. 18 is a diagram showing a result of merging a document according to the first embodiment.

Numeral 1714 indicates a merge button, and by pressing this button, the merging process of S1603 is executed. When the merge button 1714 is pressed while in the state shown in FIG. 17, merging is performed with the document P as the background and the document Q as the foreground, and therefore the merged document becomes as shown in FIG. 18, which is described later. Furthermore, numeral 1715 indicates a cancel button, and when this button is pressed, a return is made to the display screen 1500 shown in FIG. 15.

FIG. 18 is a diagram showing a result of merging a document according to the first embodiment. A document 1801 indicates a document in which the document P and the document Q shown in FIG. 17 are merged. As shown in FIG. 18, when the documents are merged, the star shaped object 1705 is hidden behind the rectangular object 1708.

Figure 19:
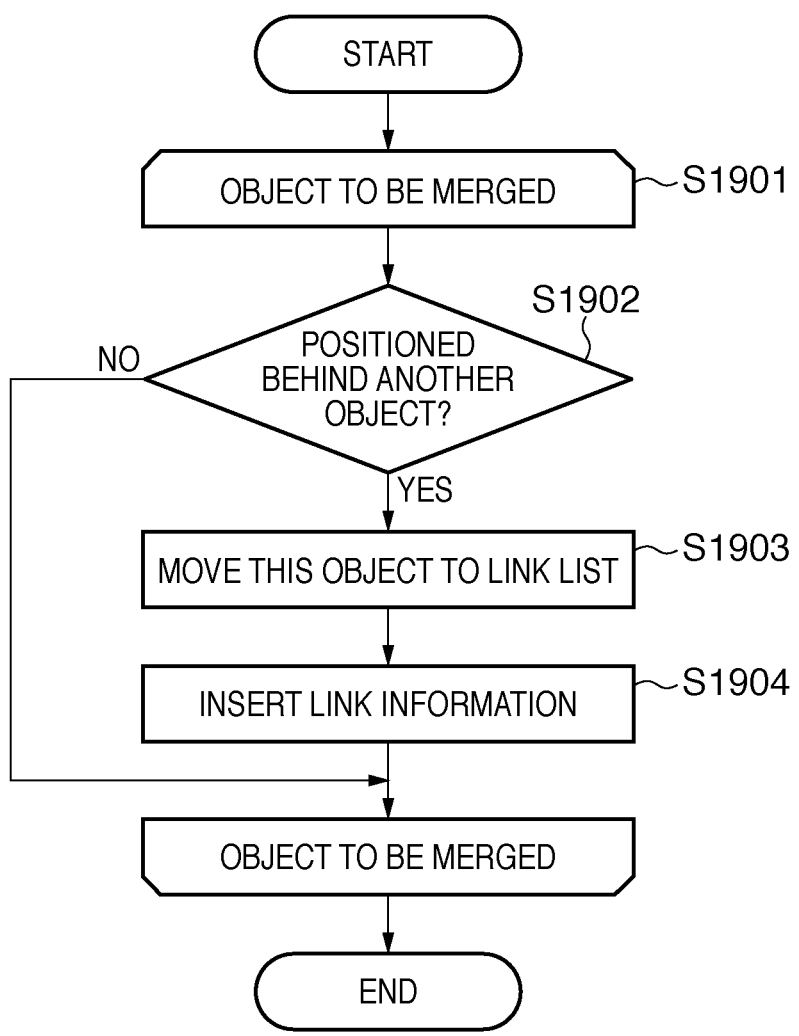
FIG. 19 is a flowchart showing a processing procedure of a process of merging a document according to the first embodiment.

Next, description is given with reference to FIG. 19 regarding a process flow of a process of merging a document according to the present embodiment. FIG. 19 is a flowchart showing a processing procedure of a process of merging a document according to the first embodiment. With the present embodiment, when merging multiple documents, a determination is performed as to whether or not at least one object is to be visualized when the composite file is to be output, and an object that will not be visualized is merged as a link. In this case, image data corresponding to the object that is merged as a link is stored in a separate file. The process described below is executed by the CPU 205 of the control unit 200 or by any of the units within the control unit 200 under the control of the CPU 205.

First, at step S1901, the CPU 205 carries out processing on the objects that constitute the documents to be merged. Next, at step S1902, the CPU 205 determines whether or not an object is positioned behind another object. Here, when it is determined that the object is not positioned behind another object, a transition is made to the processing of a next object. On the other hand, when it is determined that the object is positioned behind another object, a transition is made to step S1903.

At step S1903, the CPU 205 sets the object that has been determined to be positioned behind another object in a link list of a separate file. The link list may also be stored inside the MFP 100 currently processing. Furthermore, the link list may also be stored in a memory connected to the MFP 100 currently processing. Furthermore, the link list may also be stored inside another processing apparatus connected via a network to the MFP 100 currently processing. Next, at step S1904, the CPU 205 inserts, as link information, information indicating that the object in the document to be merged has been moved to the link list.

Figure 20:
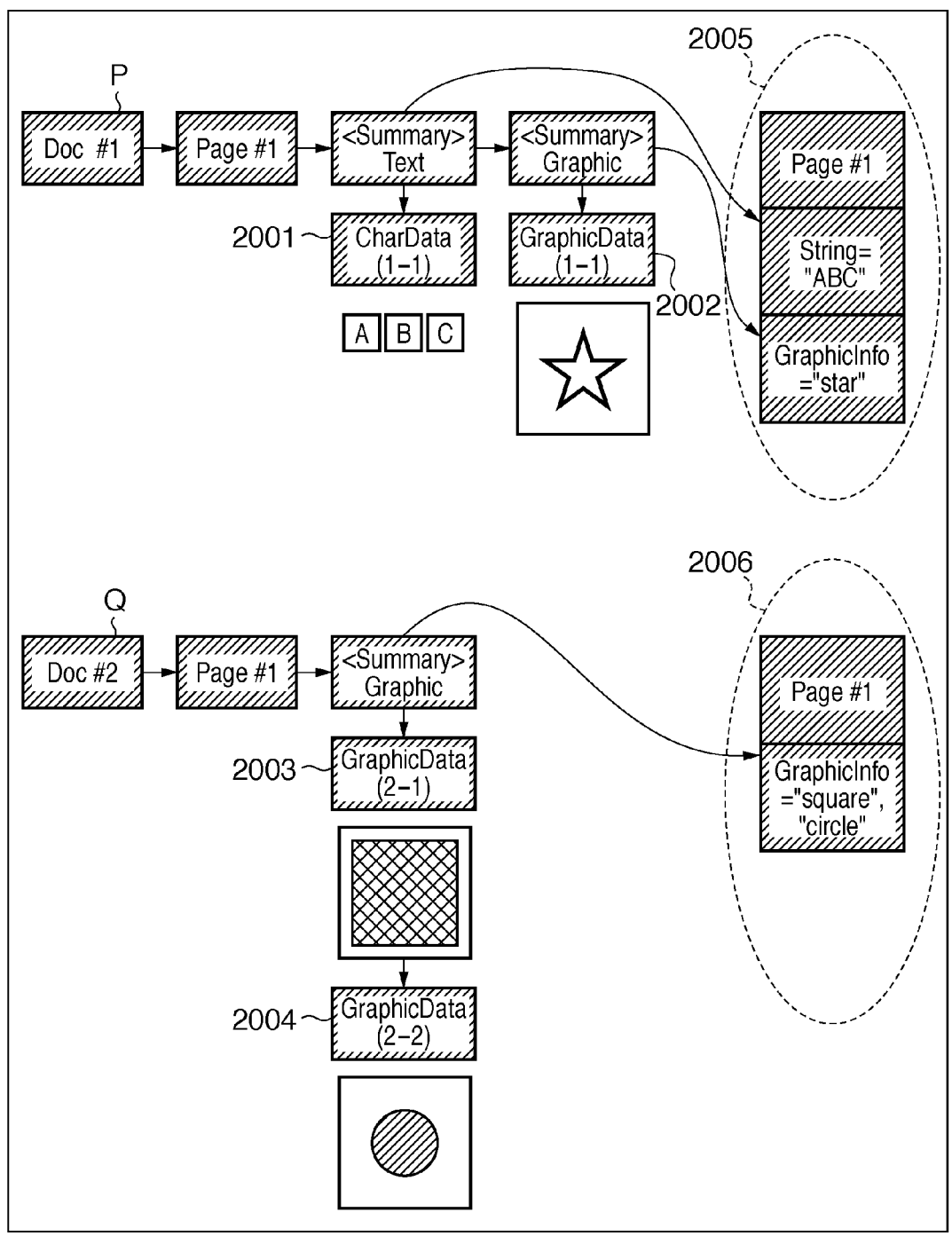
FIG. 20 is a diagram showing document data before merging according to the first embodiment.
Figure 21:
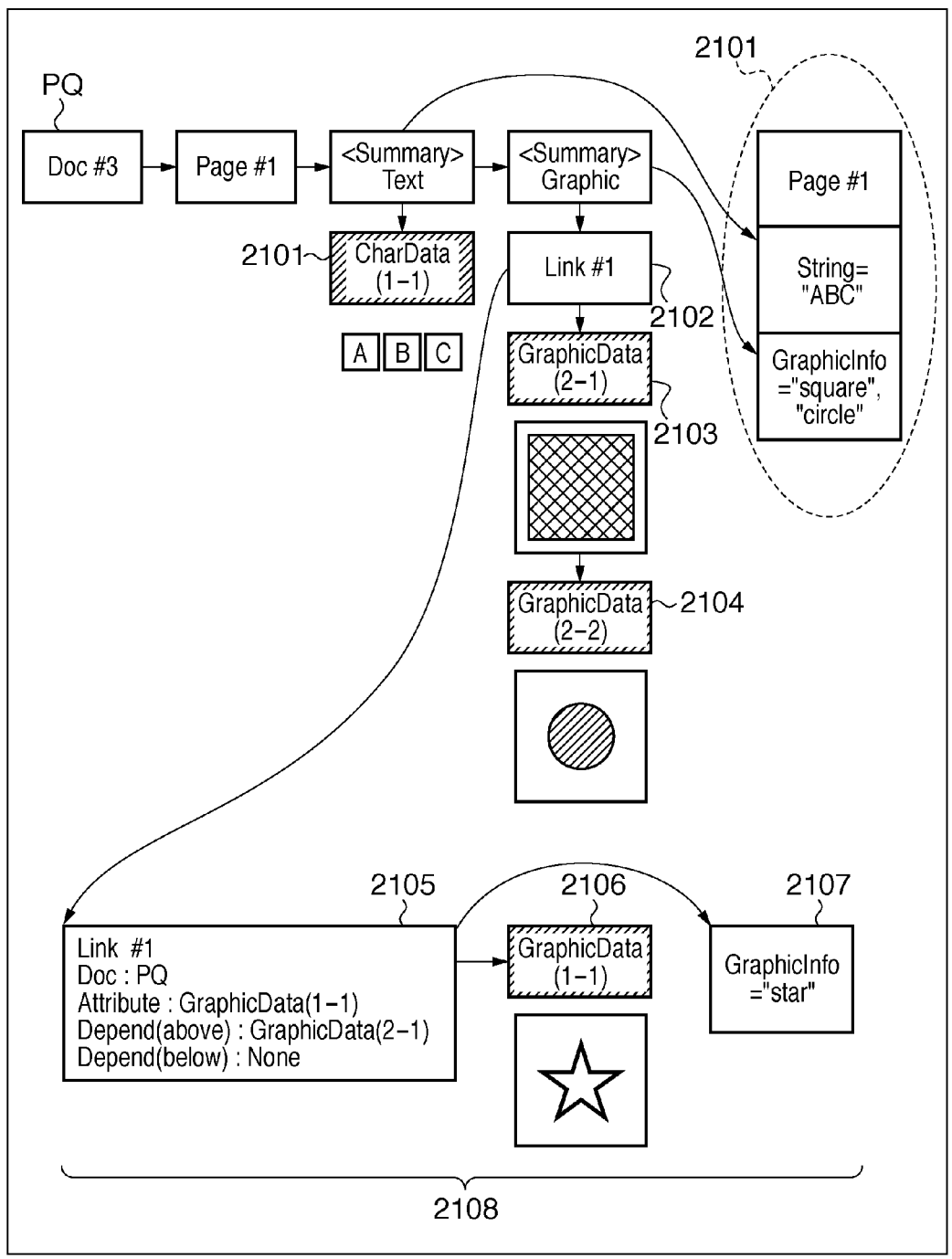
FIG. 21 is a diagram showing document data after merging according to the first embodiment.

Next, description is given with reference to FIG. 20 and FIG. 21 regarding a specific example of a document merging process. FIG. 20 is a diagram showing document data before merging according to the first embodiment. FIG. 20 shows the document data before merging when generating a document (PQ) by merging the same documents (P and Q) described in FIG. 17.

Numeral 2001 indicates vector data (CharData 1-1) of the object 1706 of text. Numeral 2002 indicates vector data (GraphicData 1-1) of the object 1705 of a graphic. Numeral 2005 shows metadata of the document P.

Numeral 2003 indicates vector data (GraphicData 2-1) of the object 1708 of a graphic. Numeral 2004 indicates vector data (GraphicData 2-2) of the object 1709 of a graphic. Numeral 2006 shows metadata of the document Q.

FIG. 21 is a diagram showing document data after merging according to the first embodiment. FIG. 21 shows the document data after merging when generating a document (PQ) by merging the same documents (P and Q) described in FIG. 17.

The text object 2001 in FIG. 20 is merged as it is as a text object 2101. The graphic object 2002 is inserted as link information 2102 since it was determined in the process of S1902 to be positioned behind the graphic object 2003. Furthermore, numeral 2110 indicates metadata of the document PQ.

Furthermore, a link list 2108 is generated and an entity of the link information 2102 is placed at a "Link #1" 2105. An entity 2105 of the link includes a document name (PQ), the vector data GraphicData (1-1) 2106, dependency information, and metadata 2107. The dependency information includes information concerning which object the entity 2105 of the link is positioned behind and information concerning of which object it is positioned in front. The graphic object 2003 is merged as it is as a graphic object 2103. The graphic object 2004 is merged as it is as a circular object 2104 of a graphic.

As described above, in merging multiple files, the image processing apparatus according to the present embodiment determines whether or not objects (images or the like) contained in the multiple files are hidden behind another object. Further still, the image processing apparatus merges objects that are completely hidden behind another object as link information in the composite file, and image data corresponding to the objects is stored in a separate file. In this way, in outputting a composite file, the image processing apparatus stores link information of an object hidden by another object instead of the image data thereof, thereby reducing the data size of the composite file without affecting the output of the composite file. Furthermore, since image data necessary for outputting the composite file is stored in the composite file, the processing load during output can be reduced. It should be noted that the foregoing description described a case where an object completely hidden behind another object is determined to be an object that is not visualized when outputting a composite file, but other embodiments are also possible. Namely, for example, it is conceivable to set an attribute for each object contained in the composite file indicating whether or not the object is to be output. In a case such as this, it is possible that when an attribute indicating that an object is not to be output has been set for at least one object contained in the composite file, it is determined that the object is not to be visualized. That is, in a case where an attribute is set indicating that at least one object is not to be output, it is possible to store link information instead of image data according to the above-described method. And further still, a determination may be performed as to whether or not an object is to be visualized based on a color attribute of the object contained in the composite file. That is, when transparency or the same color attribute as the background has been set for an object, even if that object is output it will not in fact be recognized by the user, that is, it will not be visualized. For this reason, objects in which transparency or the same color attribute as the background has been set can be stored as link information instead of image data according to the above-described method.

Second Embodiment

Next, description is given regarding a second embodiment with reference to FIG. 22 through FIG. 25. In the first embodiment, description was given regarding a document merging process, but in the present embodiment, description is given regarding a document editing process.

Figure 22:
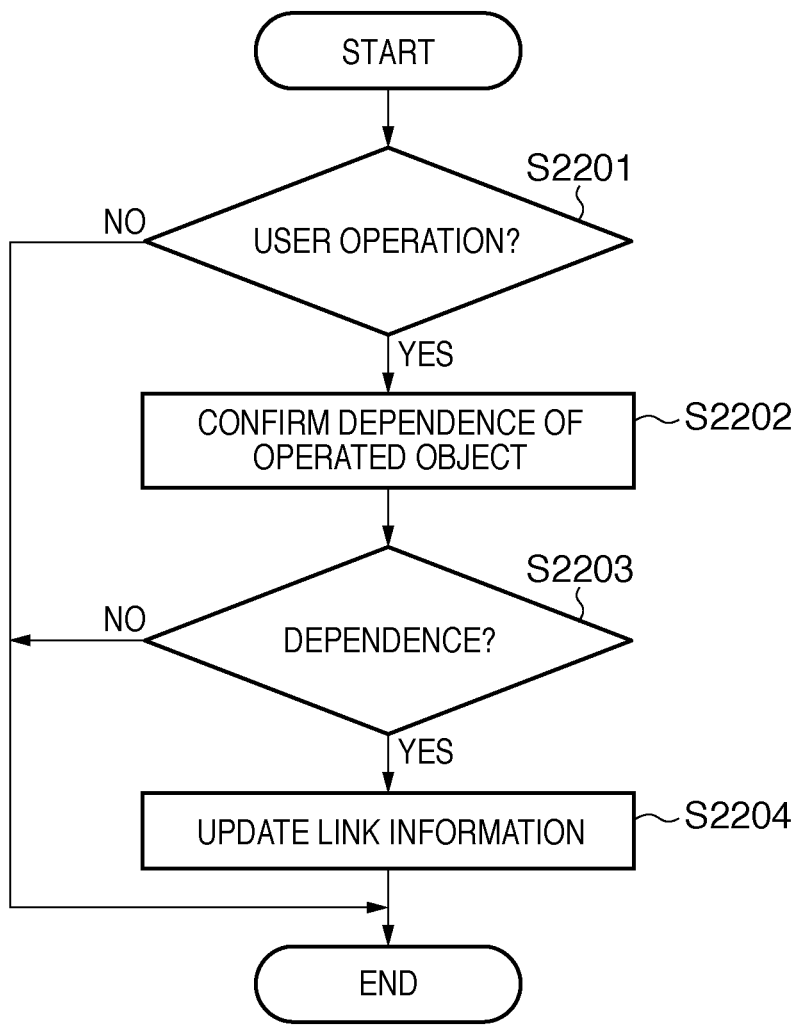
FIG. 22 is a flowchart showing a processing procedure of a process of editing a document according to a second embodiment.

FIG. 22 is a flowchart showing a processing procedure of a process of editing a document according to a second embodiment. Here, a processing flow is shown for a case where the operator presses the edit button 1503 shown in FIG. 15 to edit a document. The process described below is executed by the CPU 205 of the control unit 200 or by any of the units within the control unit 200 under the control of the CPU 205.

At step S2201, the CPU 205 determines whether or not there has been a user operation. Here, when there has been no user operation, the CPU 205 causes the processing to finish. On the other hand, when there has been a user operation, the CPU 205 causes the process to transition to step S2202.

Next, at step S2202, the CPU 205 confirms a dependence (positional relationship) of the object that has been operated. Confirmation of dependence refers to confirming whether or not there has been a change in an arrangement of an object (presence/absence of overlap) by the user operation. Following this, at step S2203, the CPU 205 determines whether or not there is dependence. Here, when there is no dependence, the CPU 205 causes the processing to finish. On the other hand, when there his dependence, the CPU 205 causes the process to transition to step S2204. At step S2204, the CPU 205 updates link information relating to the object having dependence.

Figure 23:
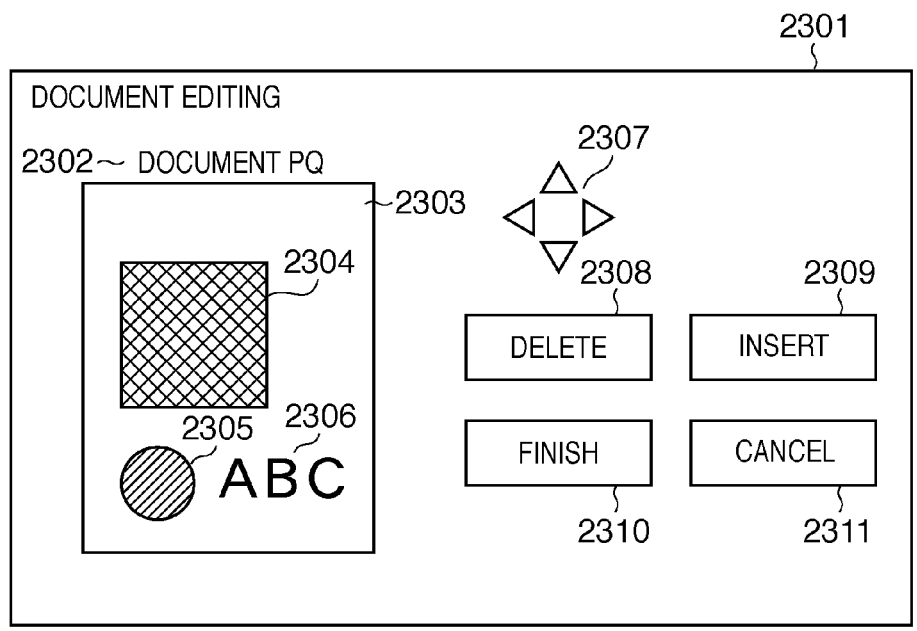
FIG. 23 is a diagram showing an editing screen 2301 for editing a merged document according to the second embodiment.
Figure 24:
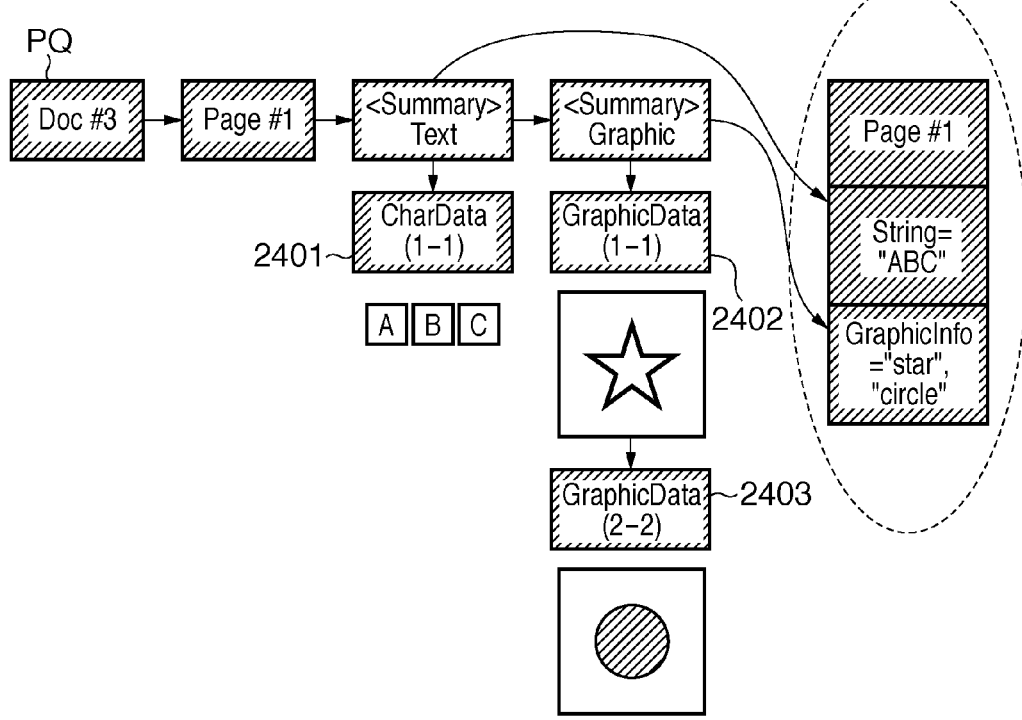
FIG. 24 is a diagram showing document data after editing according to the second embodiment.
Figure 25:
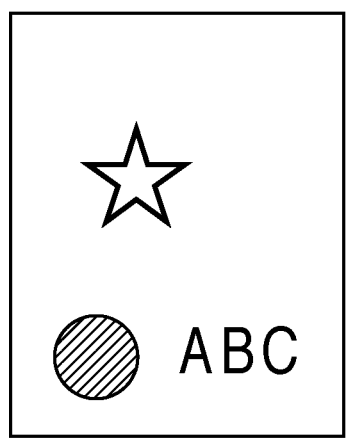
FIG. 25 is a diagram showing a document after the document editing process according to the second embodiment has been executed.

Next, description is given with reference to FIG. 23 through FIG. 25 regarding a specific example of a document editing process. FIG. 23 is a diagram showing an editing screen 2301 for editing a merged document according to the second embodiment. The editing screen 2301 is for editing the document PQ that has been merged in FIG. 21 for example, and is a screen displayed on the operation unit 210 when the edit button 1503 shown in FIG. 15 is pressed.

Numeral 2302 indicates a name of the document to be edited. Here, this is "document PQ". In the present embodiment, description is given of one example of editing the "document PQ" shown in FIG. 21. Numeral 2303 shows a preview of the document PQ. The document PQ includes a rectangular object 2304, a circular object, 2305, and a text object 2306 of "ABC". An unshown star shaped object is hidden behind the rectangular object 2304.

Numeral 2307 indicates buttons for moving objects. Numeral 2308 indicates a delete button, and objects can be deleted by pressing this button. Numeral 2309 indicates an insert button, and objects can be inserted by pressing this button. Numeral 2310 indicates a finish button, and by pressing this button it is possible to apply the editing that has been performed up to that time and finish the editing of the document. Numeral 2311 indicates a cancel button, and by pressing this button it is possible to finish the editing of the document without applying the editing that has been performed up to that time.

FIG. 24 is a diagram showing document data after editing according to the second embodiment. The document data shown in FIG. 24 is document data of when the editing screen 2301 has been operated to delete the rectangular object 2304. The text object 2101 shown in FIG. 21 has no dependence on the process of deleting the rectangular object 2103, and therefore it remains as it is as a text object 2401. Furthermore, the circular object 2104 also has no dependence on the process of deleting the rectangular object 2103, and therefore it remains as it is as a circular object 2403.

Link information 2102 is dependent on the process of deleting the rectangular object 2103. Accordingly, when the rectangular object 2103 is deleted, its dependence on the rectangular object 2103 is confirmed. This process is executed by searching the link list 2108 for the name GraphicData (2-1) of the rectangular object 2103 and confirming the dependence of the link entity in question. In the present embodiment, of the link entities that constitute the link list 2108, it is evident that the link entity 2105 is dependent on the object 2103, and further still it is evident that the GraphicData (2-1) is positioned behind.

According to the above, in a case where the rectangular object 2103 is deleted, it is necessary to substitute the link information 2102 with the link entity. As a result, the link information 2102 is substituted by an entity 2402 of the star shaped object. FIG. 25 is a diagram showing a document after the document editing process according to the second embodiment has been executed. As shown in FIG. 25, the star shaped object, which up until this time had been assigned as link information, is positioned in the document PQ after the rectangular object 2103 has been deleted.

As described above, in an image processing apparatus according to the present embodiment, in a case where a composite file has been edited, for example in a case where a certain object has been deleted, the dependence of that object is confirmed. Then, the composite file and the link information are updated based on the dependence (positional relationship) that has been confirmed. In this way, with this image processing apparatus it is possible to easily edit a composite file after the composite file has been generated, and data can be updated corresponding to the editing based on link information and additional information.

Third Embodiment

Next, description is given regarding a third embodiment with reference to FIG. 26 through FIG. 29. In this embodiment, description is given concerning a process of searching a document.

Figure 26:
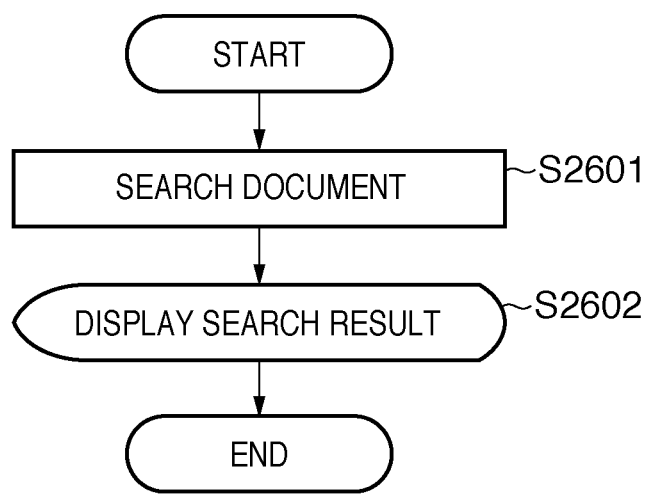
FIG. 26 is a flowchart showing a processing procedure of a process of searching a document according to a third embodiment.

FIG. 26 is a flowchart showing a processing procedure of a process of searching a document according to the third embodiment. A search process is executed when the operator presses the search button 1504 shown in FIG. 15. The process described below is executed by the CPU 205 of the control unit 200 or by any of the units within the control unit 200 under the control of the CPU 205.

In step S2601, based on a search keyword (character code) and a search condition input by the operator, the CPU 205 searches for documents that contain the search keyword. Next, at step S2602, the CPU 205 displays a search result on the operation unit 210 of the MFP 100.

Figure 28:
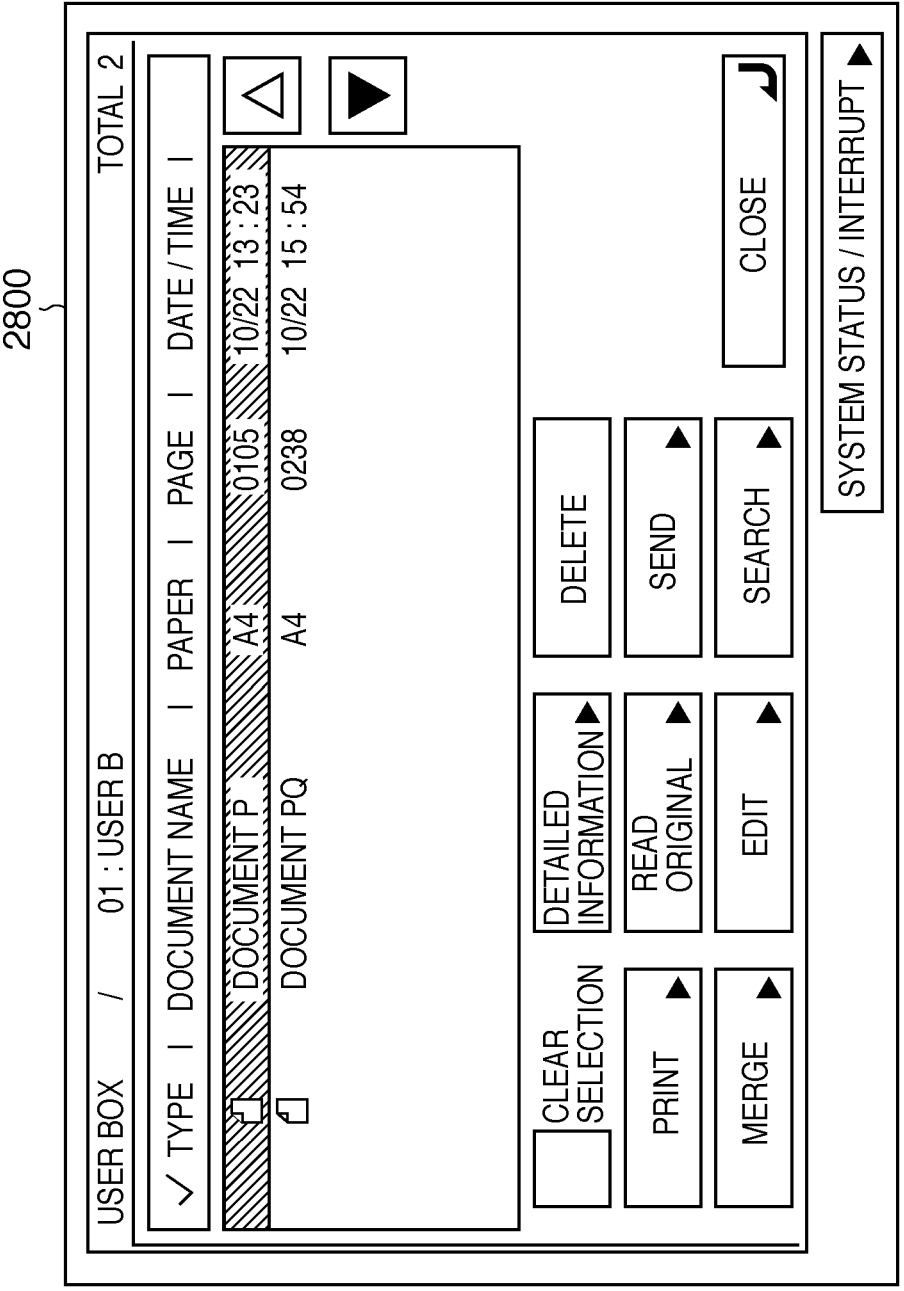
FIG. 28 is a diagram showing a display screen 2800 after the document search process according to the third embodiment has been executed.
Figure 29:
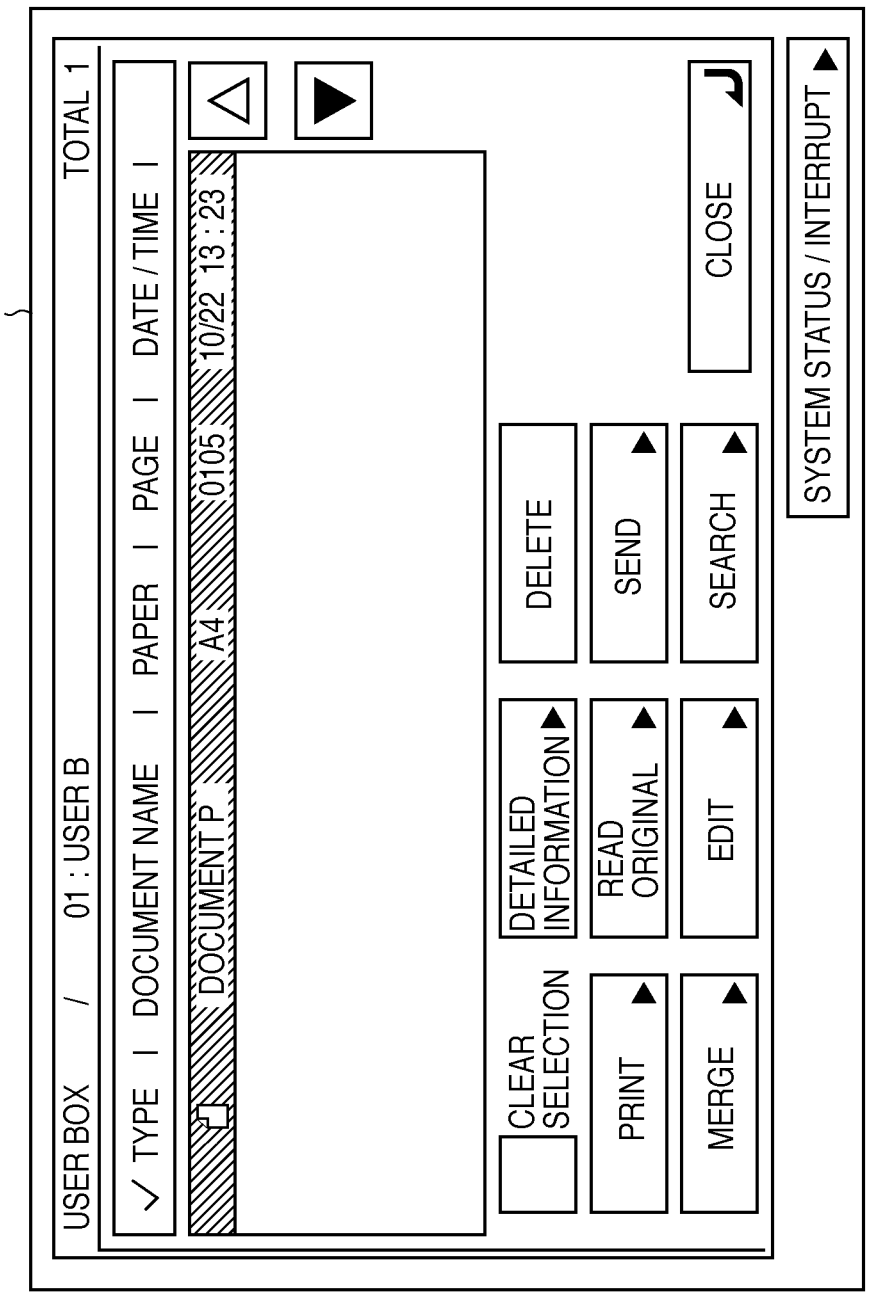
FIG. 29 is a diagram showing a display screen 2900 after the document search process according to the third embodiment has been executed.

Next, description is given with reference to FIG. 27 through FIG. 29 regarding a specific example of a document search process. FIG. 27 is a diagram showing a document search screen 2701 according to the third embodiment. The document search screen 2701 is displayed when the search button 1504 shown in FIG. 15 is pressed. By operating the search screen 2701, the operator can carry out a document search.

Numeral 2702 indicates a text box into which the operator can arbitrarily input a character string as a target to be searched. In the example shown in FIG. 27, the operator has already input a character string of "star". Numeral 2703 indicates a checkbox for selecting whether or not objects that are invisible as output due to the overlapping of objects are to be search targets. FIG. 27 shows a state in which the operator has checked the checkbox.

Numeral 2704 indicates a start search button, and by pressing this button, the document search that has been set by the operator is carried out. Numeral 2705 indicates a cancel button, and a return is made to the display screen 1500 shown in FIG. 15 by pressing this button.

FIG. 28 is a diagram showing a display screen 2800 after the document search process according to the third embodiment has been executed. The display screen 2800 shows search results of when the search start button 2704 has been pressed under the state shown in the search screen 2701. Here, two search hits are displayed, the documents P and PQ.

Here, detailed description is given regarding a process of searching the document PQ shown in FIG. 21 with the conditions of FIG. 27. Object searches are carried out targeting metadata. First, a search of metadata 2110 is carried out, but there are no hits for the character string "star". Next, since the checkbox 2703 is checked, a search of the metadata 2107 of the link list 2108 is carried out. The character string "star" is contained in the metadata 2107, and therefore the document PQ becomes a hit in the search results with the conditions shown in FIG. 27. On the other hand, in a case where the checkbox 2703 is not checked, a search of the metadata 2107 of the link list 2108 is not carried out, and therefore the search results are as shown in FIG. 29. FIG. 29 is a diagram showing a display screen 2900 after the document search process according to the third embodiment has been executed. As shown in FIG. 29, the search results in a state where the checkbox 2703 is not checked give only the document P as a hit and there is no hit for the document PQ.

As described above, in addition to the merged objects, the image processing apparatus according to the present embodiment may store additional information for each object in the composite file or a separate file. Here, the additional information may be a character code that expresses a feature of each of the objects for example. In this case, the image processing apparatus enables the user to search for a desired object using a character code as a search keyword. Furthermore, in a case where additional information of the objects is not contained in the composite file, the user can search for a desired object using link information.

It should be noted that the present invention is not limited to the foregoing embodiments and various modifications are possible. For example, additional information (metadata) of all the objects contained in the composite file may be contained in a separate file from the composite file. In this way, the data size of the composite file can be further reduced.

Fourth Embodiment

Figure 30:
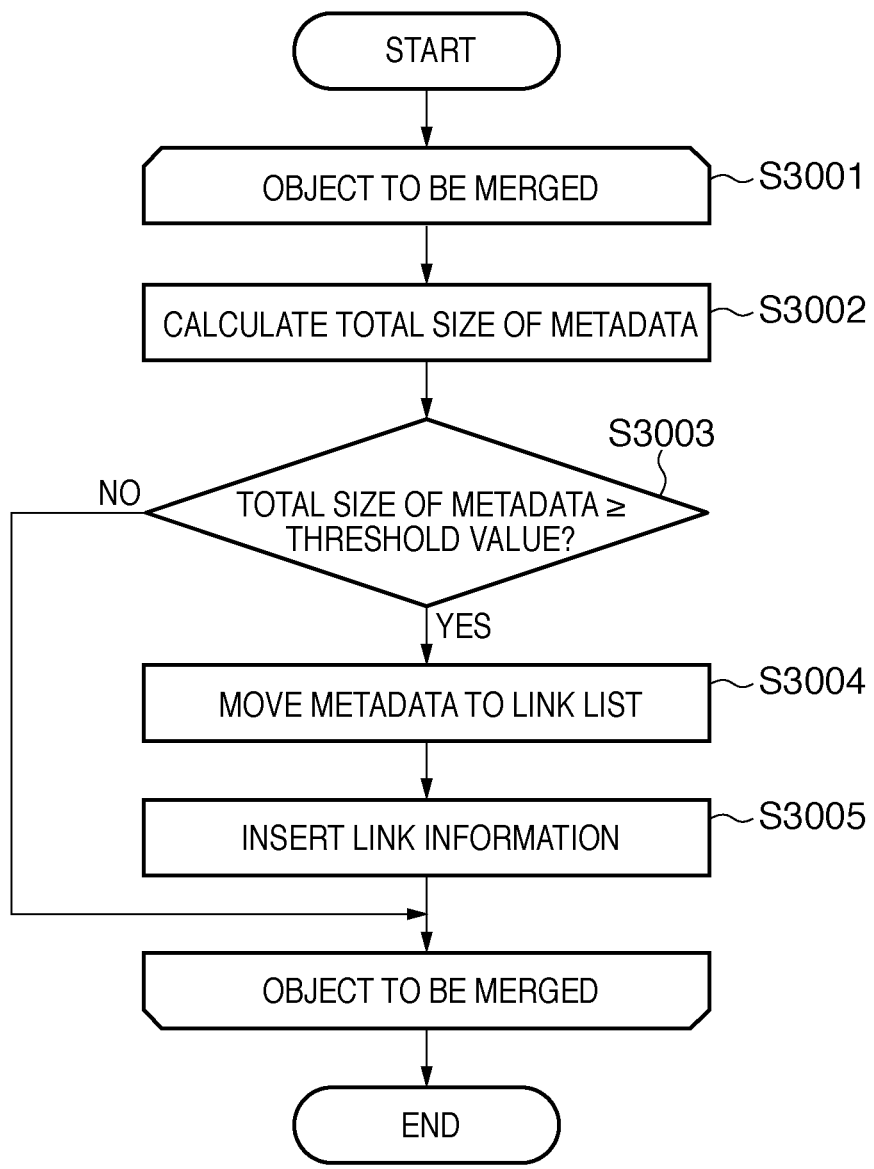
FIG. 30 is a flowchart showing a processing procedure of a process of merging a document according to a fourth embodiment.
Figure 31:
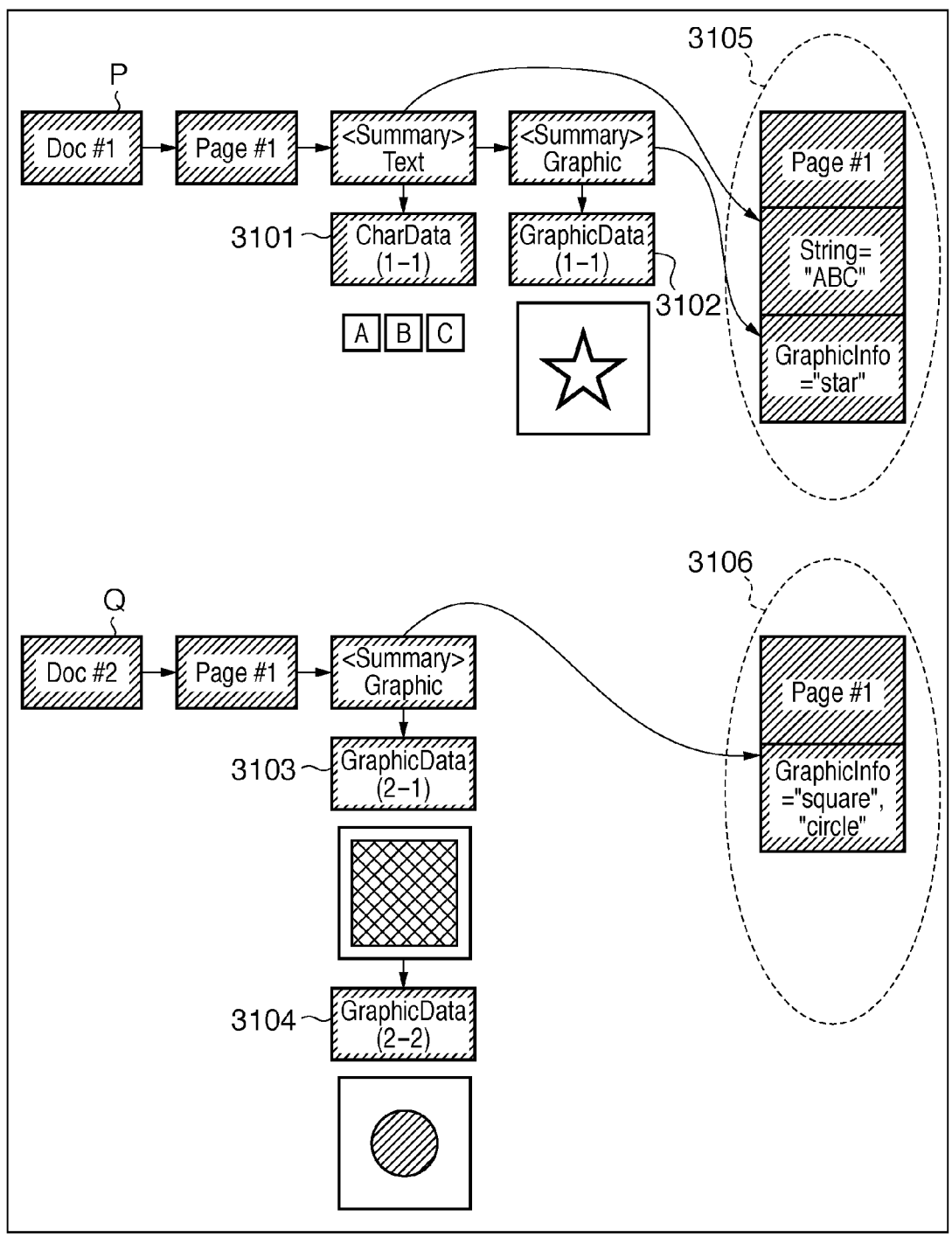
FIG. 31 is a diagram showing document data before document merging according to the fourth embodiment.
Figure 32:
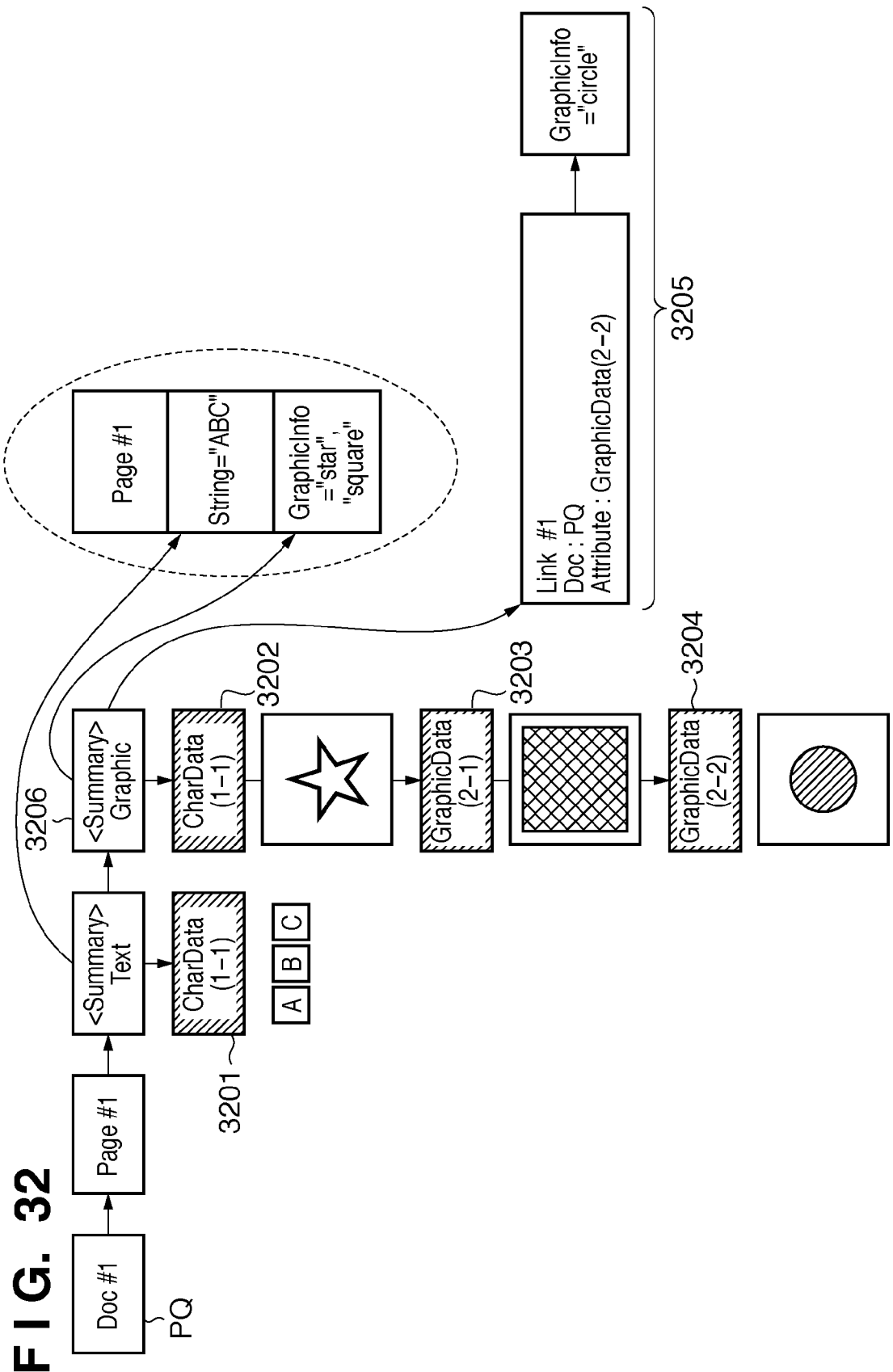
FIG. 32 is a diagram showing document data after document merging according to the fourth embodiment.

Next, description is given regarding a fourth embodiment with reference to FIG. 30 through FIG. 32. In the first embodiment, in regard to the document merging process, the merging process was carried out by determining whether or not a certain object was hidden behind another object. However, in the present embodiment, description is given regarding an example in which the document merging process is carried out by determining whether or not a size of the metadata exceeds a threshold value.

FIG. 30 is a flowchart showing a processing procedure of a process of merging a document according to the fourth embodiment. Here, description is given regarding a procedure in which the document merging process is carried out while determining whether or not a size of the metadata exceeds a predetermined threshold value. The process described below is executed by the CPU 205 of the control unit 200 or by any of the units within the control unit 200 under the control of the CPU 205.

First, at step S3001, the CPU 205 carries out processing on the objects that constitute the documents to be merged. Next, at step S3002, the CPU 205 calculates the total size of the metadata. Following this, at step S3003, the CPU 205 determines whether or not the calculated size exceeds the predetermined threshold value. This threshold value may be a fixed value that is set in advance and may be a value that is determined dynamically giving consideration to the capacity of the HDD. In the present invention, there is no particular stipulation regarding a method for calculating the threshold value.

When the total size is smaller than the threshold value, the CPU 205 makes a transition to processing the next object. On the other hand, when total size is the threshold value or greater, the CPU 205 causes the process to transition to step S3004. At step S3004, the CPU 205 sets the metadata of the objects to be merged as a link list of a separate file. The link list may also be stored inside the MFP 100 currently processing. It may also be stored in a memory connected to the MFP 100 currently processing. Furthermore, the link list may also be stored inside a separate processing apparatus connected via a network to the MFP 100 currently processing. Next, at step S3005, the CPU 205 inserts link information expressing that the metadata in the documents to be merged have been moved to a link list. The foregoing process is carried out on all objects contained in the targeted documents.

Next, description is given with reference to FIG. 31 and FIG. 32 regarding details of a document merging process according to the present embodiment. FIG. 31 is a diagram showing document data before document merging according to the fourth embodiment.

Numeral 3101 indicates vector data (CharData 1-1) of the object 1706 of text. Numeral 3102 indicates vector data (GraphicData 1-1) of the object 1705 of a graphic. Numeral 3105 shows metadata of the document P. Numeral 3103 indicates vector data (GraphicData 2-1) of the object 1708 of a graphic. Numeral 3104 indicates vector data (GraphicData 2-2) of the object 1709 of a graphic. And numeral 3106 shows metadata of the document Q.

FIG. 32 is a diagram showing document data after document merging according to the fourth embodiment. As a result of the threshold value determination, the total size of the metadata of the text object 2001, the graphic object 2002, and the graphic object 2003 is smaller than the threshold value, and therefore these objects are simply merged. However, the total size of the metadata exceeds the threshold value when the graphic object 2004 is merged, and therefore an entity of the metadata of only the graphic object 2004 is placed in the link list 3205. It should be noted that the link information is stored in a summary 3206.

As described above, the image processing apparatus according to the present embodiment determines whether or not additional information for each object contained in the composite file exceeds a predetermined threshold value, and when the threshold value is exceeded, additional information for that data size is stored to a separate file. In this way, the image processing apparatus can keep the data size of the composite file within a fixed size and the data size of the composite file can be reduced even more favorably. It should be noted that the above description was regarding an example in which the processing according to the flowchart shown in FIG. 19 and the processing according to the flowchart shown in FIG. 30 were executed separately, but it is also possible to combine these for execution. That is, in parallel with a process in which link information from image data is substituted in accordance with the flowchart shown in FIG. 19, it is also possible to carry out a process of confirming the size of the metadata and inserting link information to the metadata in accordance with the flowchart shown in FIG. 30.

Other Embodiments

Detailed description was given above of example embodiments, but the present invention is also achievable in embodiments such as a system, an apparatus, a method, a program, and a storage medium (recording medium) or the like. Specifically, the present invention may also be applied to a system constituted by a plurality of devices, and may be applied to an apparatus constituted by a single device.

It should be noted that with the present invention, a software program that achieves the functionality of the foregoing embodiments (a program corresponding to a flowchart shown in the diagrams of the embodiments) may be supplied directly or remotely to a system or an apparatus. And the present invention also includes a case of achieving the present invention by having a computer of the system or the apparatus read out and execute the supplied program.

Consequently, the actual program code to be installed on a computer to achieve the functional processing of the present invention on the computer may achieve the present invention. That is, the present invention also includes an actual computer program for achieving the functional processing of the present invention.

In this case the program may take any form and may be object code, a program to be executed by an interpreter, or script data supplied to an OS as long as it has the functionality of the program.

Recording media for supplying the program include those shown below. For example, this includes floppy (registered trademark) disks, hard disks, optical disks, magneto-optical disks, MO, CD-ROM, CD-R, CD-RW, magnetic tape, non-volatile memory cards, ROM, DVD (DVD-ROM, DVD-R) and the like.

Additionally, as a technique for supplying the program, it is also possible to supply the program by using a browser of a client computer to download the program from an internet website to a recording medium such as a hard disk. That is, this includes connecting to a website and downloading from the website a file containing an actual computer program of the present invention or a compressed file having a self-installing function. Furthermore, it is also possible to achieve the present invention by having the program code that constitutes the program of the present invention divided into a plurality of files and downloading the files from different websites respectively. That is, a WWW server that enables a plurality of users to download the program files for achieving the functional processing of the present invention on a computer is also included within the present invention.

Furthermore, a program of the present invention may also be encrypted and stored on a computer-readable storage medium such as a CD-ROM for distribution to users. Then, users who clear a predetermined condition are allowed to download from a website via the Internet information of a key that unlocks the encoding. Then, the present invention may be achieved by using the key information to execute the encoded program and install it on a computer.

Furthermore, the functionality of the foregoing embodiments is achieved by having a computer execute the program that has been read out. Additionally, an OS or the like that runs on a computer may carry out a part or all of the actual processing according to instructions of the program, such that the functionality of the foregoing embodiments is achieved by the processing thereof.

Further still, the program that is read out from the recording medium may be written onto a memory provided in an extension board inserted into the computer or an extension unit connected to the computer, after which the functionality of the foregoing embodiments can be achieved. That is, a CPU or the like provided in the extension board or extension unit may carry out a part or all of the actual processing according to instructions of the program such that the functionality of the foregoing embodiments is achieved.

According to the present invention, an image processing apparatus can be provided for example that reduces a data size of a composite file without affecting output when generating a composite file by merging multiple files containing objects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-133544 filed on May 21, 2008, which is hereby incorporated by reference herein in its entirety.

What is claimed is:

1. An image processing apparatus, comprising:
a hardware processor;
a memory connected to the hardware processor;
a generation unit that generates a composite file in which multiple files are merged,
a determination unit that determines, when the composite file is generated by the generation unit, whether or not at least one object of objects contained in the multiple files is to be visualized when the composite file is output, wherein the determination unit determines that the object is not to be visualized when at least one object contained in the composite file is positioned behind another object in the composite file;
a first storage unit that stores, as a separate file, image data of an object determined not to be visualized based on a determination result of the determination unit, but does not store, as a separate file, image data of an object determined to be visualized, as the separate file based on a determination result of the determination unit, and
a second storage unit that stores information indicating the image data stored in the separate file as link information in the composite file;
wherein at least one of the generation unit, the determination unit, the first storage unit and the second storage unit is implemented, at least in part, by the hardware processor and the memory.

2. The image processing apparatus according to claim 1, wherein the determination unit, when an attribute indicating that a second object is not to be output has been set for at least one object contained in the composite file, determines that the second object is not to be visualized.

3. The image processing apparatus according to claim 1, wherein the determination unit, when transparency or a same color attribute as a background has been set for an additional object contained in the composite file, determines that the additional object is not to be visualized.

4. The image processing apparatus according to claim 1, wherein additional information of an object corresponding to image data to be stored is further stored in the composite file and the separate file respectively.

5. The image processing apparatus according to claim 4,
wherein a character code that expresses a feature of each of the objects is contained in the additional information, and
the apparatus further comprises a search unit that searches objects that constitute a file using the character code as a search keyword.

6. The image processing apparatus according to claim 5, further comprising a first display control unit that displays on a display device of the image processing apparatus a search screen for enabling an operator to input the search keyword and a search condition, and
wherein information indicating whether or not an object stored by the first storage unit is a search target is contained in the search condition.

7. The image processing apparatus according to claim 4,
wherein the determination unit, further determines an object to be linked to in the separate file by determining whether or not a total size of additional information for each of the objects exceeds a predetermined threshold value.

8. The image processing apparatus according to claim 1, wherein additional information of an object contained in the composite file is further stored in the separate file.

9. The image processing apparatus according to claim 1, further comprising:
a second display control unit that displays on a display device of the image processing apparatus an editing screen for enabling an operator to instruct editing of the composite file,
a confirmation unit that confirms, when an instruction has been input via the editing screen that at least one object contained in the composite file is to be deleted, a dependence between the object to be deleted and another object, and
an update unit that updates the composite file and the link information based on the dependence that has been confirmed.

10. The image processing apparatus according to claim 9, wherein the dependence is a positional relationship between the object to be deleted and another object, and
in addition to image data to be stored, positional relationship information indicating whether an object corresponding to the image data is positioned behind or in front of the other object is stored in the separate file.

11. The image processing apparatus according to claim 1, wherein the composite file includes resolution-independent data, which is independent of at least a printing resolution.

12. The image processing apparatus according to claim 1, wherein the composite file includes intermediate code for converting to bitmap data from resolution-independent data, which is independent of at least a printing resolution.

13. A control method for an image processing apparatus, comprising:

generating a composite file in which multiple files are merged, determining, in the generating of the composite file, whether or not at least one object of objects contained in the multiple files is to be visualized when the composite file is to be output, determining that the object is not to be visualized when at least one object contained in the composite file is positioned behind another object in the composite file;

initially storing as a separate file image data of an object determined not to be visualized based on a determination result of the determining, but not storing, as a separate file, image data of an object determined to be visualized, as the separate file based on a determination result of the determining, and secondarily storing information indicating the image data stored in the separate file as link information in the composite file.

14. A non-transitory computer-readable storage medium storing a program for executing on a computer a control method for an image processing apparatus, the method comprising:

generating a composite file in which multiple files are merged, determining, in the generating of the composite file, whether or not at least one object of objects contained in the multiple files is to be visualized when the composite file is to be output, determining that the object is not to be visualized when at least one object contained in the composite file is positioned behind another object in the composite file;

initially storing as a separate file image data of an object determined not to be visualized based on a determination result of the determining, but not storing, as a separate file, image data of an object determined to be visualized, as the separate file based on a determination result of the determining, and secondarily storing information indicating the image data stored in the separate file as link information in the composite file.

\* \* \* \* \*